(12) United States Patent
Ferry et al.

(10) Patent No.: US 7,914,241 B2
(45) Date of Patent: Mar. 29, 2011

(54) TAPPING TOOL

(75) Inventors: Gregory S. Ferry, Milaca, MN (US); Steven H. Thomson, Elk River, MN (US)

(73) Assignee: Mate Precision Tooling Inc., Anoka, MN (US)

( * ) Notice: Subject to any disclaimer, the term of this patent is extended or adjusted under 35 U.S.C. 154(b) by 983 days.

(21) Appl. No.: 11/658,921

(22) PCT Filed: Aug. 4, 2005

(86) PCT No.: PCT/US2005/027804
§ 371 (c)(1),
(2), (4) Date: Jan. 30, 2007

(87) PCT Pub. No.: WO2006/017690
PCT Pub. Date: Feb. 16, 2006

(65) Prior Publication Data
US 2009/0010727 A1    Jan. 8, 2009

Related U.S. Application Data

(60) Provisional application No. 60/599,188, filed on Aug. 4, 2004.

(51) Int. Cl.
*B23Q 11/10* (2006.01)
(52) U.S. Cl. .............................. 408/56; 408/61; 408/124
(58) Field of Classification Search .................... 409/66; 408/56, 61, 124, 141; 470/96, 198, 207
See application file for complete search history.

(56) References Cited

U.S. PATENT DOCUMENTS

| 1,195,145 | A |   | 8/1916  | Mattingly |
| 2,084,022 | A |   | 6/1937  | Frank |
| 2,253,349 | A |   | 7/1941  | Berquist |
| 2,429,741 | A | * | 10/1947 | Barfels ........................... 408/61 |
| 2,501,738 | A |   | 3/1950  | Prutton |
| 2,686,440 | A | * | 8/1954  | Van Cutsem .................... 408/61 |
| 2,715,233 | A |   | 8/1955  | Clark |
| 2,749,561 | A | * | 6/1956  | Rush ............................... 470/87 |
| 2,922,323 | A | * | 1/1960  | Weidner .......................... 408/17 |
| 3,564,944 | A | * | 2/1971  | Hill et al. ........................ 408/61 |
| 4,449,868 | A | * | 5/1984  | Steinsberger et al. ......... 408/138 |
| 5,016,335 | A | * | 5/1991  | Becker et al. ..................... 29/57 |
| 5,890,848 | A | * | 4/1999  | Kachich ........................ 408/1 R |
| 2005/0271485 | A1 | * | 12/2005 | Kouno et al. ................. 408/124 |
| 2006/0127191 | A1 | * | 6/2006  | Chun et al. .................... 408/124 |

* cited by examiner

Primary Examiner — Daniel W Howell
(74) Attorney, Agent, or Firm — Dorsey & Whitney LLP; Stuart R. Hemphill, Esq.; Brett A. Klein, Esq.

(57) ABSTRACT

A tapping tool having a guide body, a driver for longitudinal movement of a tap within the guide body, and a pump for lubricating the tap. A keyway in the outer body of guide body mates with an indexing key in a rotatable indexing holder of a turret press, which causes the guide body to rotate in sync with the turret press. A driver cylinder is centrally disposed in the guide body. The driver is adapted for sliding, mating engagement within the driver cylinder. A chamber in the lubrication pump holds the lubrication which is ejected by the pump onto the tap. Lubrication is ejected onto the tap through a normally closed ejector inlet that is opened by downward movement of a plunge pin against the lubrication in the chamber. The ejector is sized to restrict the flow of lubrication from the ejector outlet, which creates back pressure in the lubrication chamber. The back pressure forces a ball to close the lubrication conduit when the plunge pin moves downward.

28 Claims, 28 Drawing Sheets

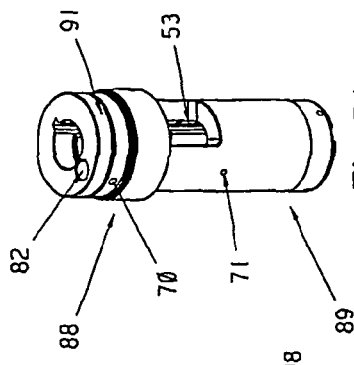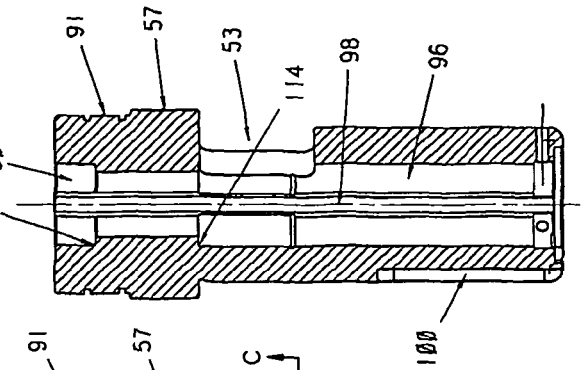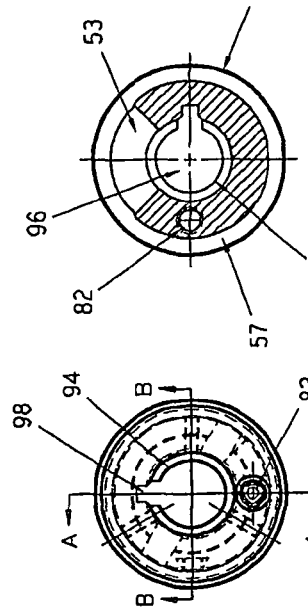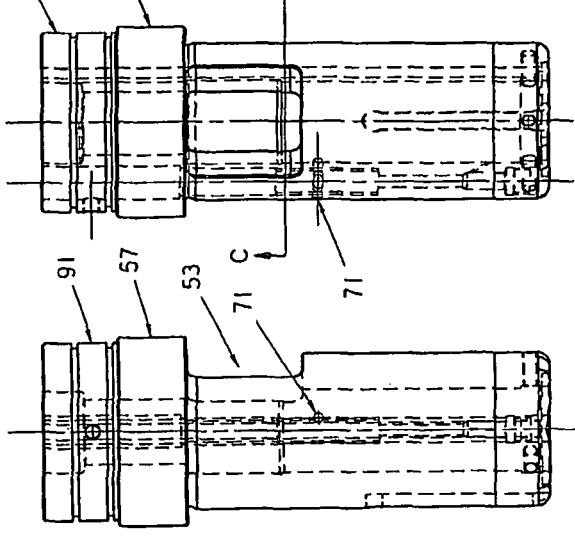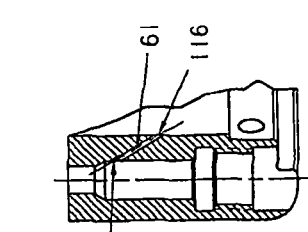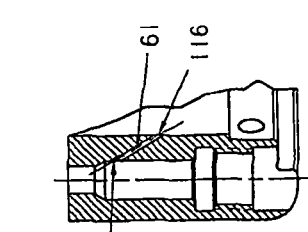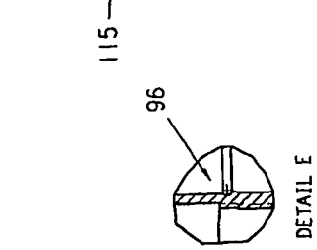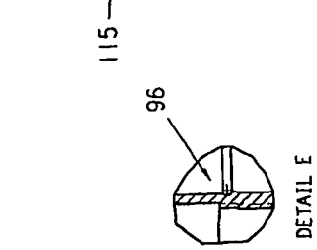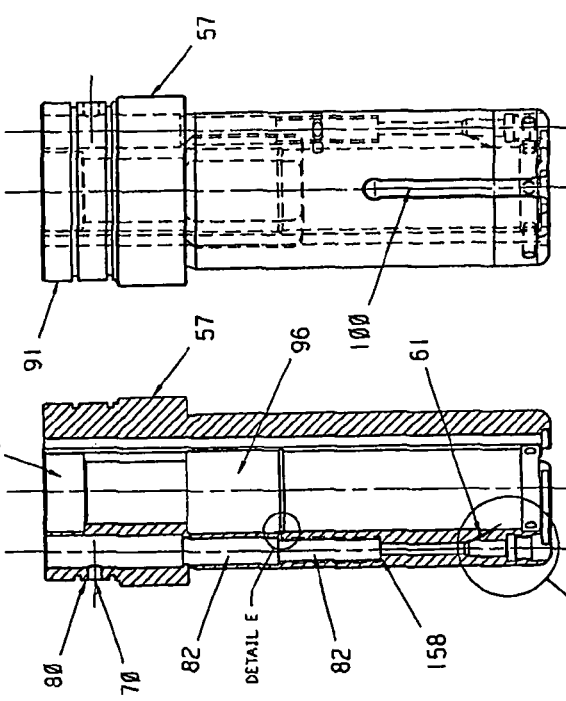

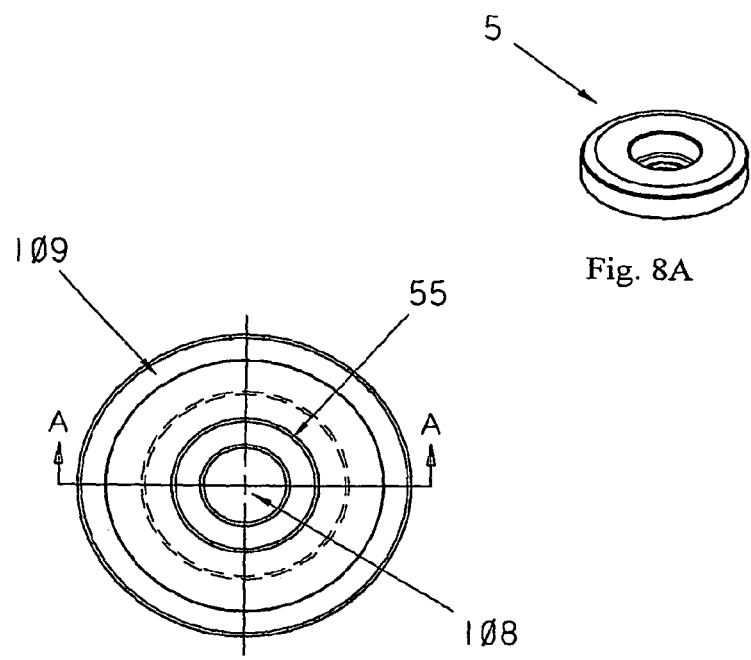
Fig. 8A
Fig. 8B
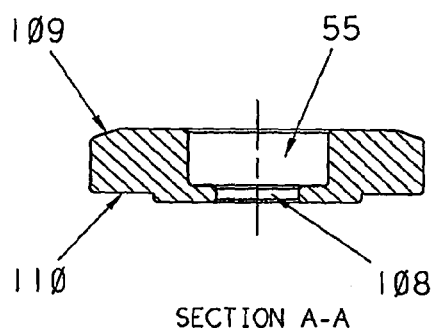
SECTION A-A
Fig. 8C

SECTION A-A

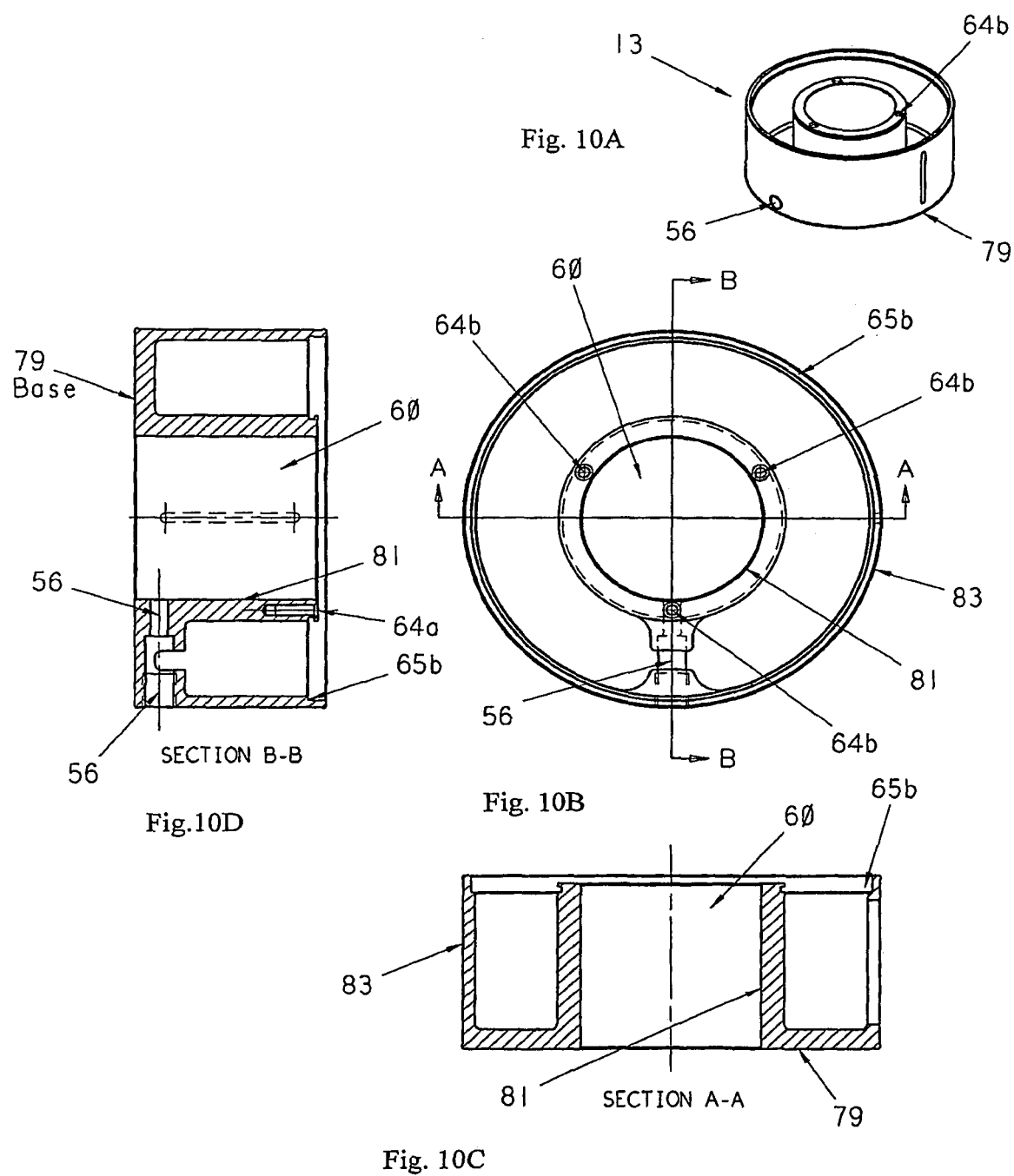

SECTION A-A

SECTION A-A

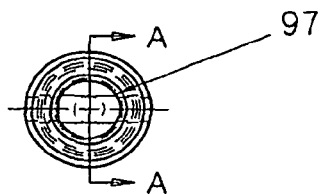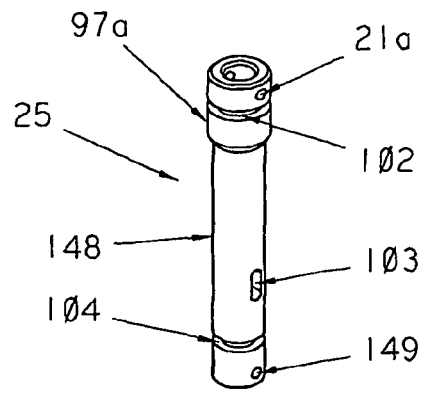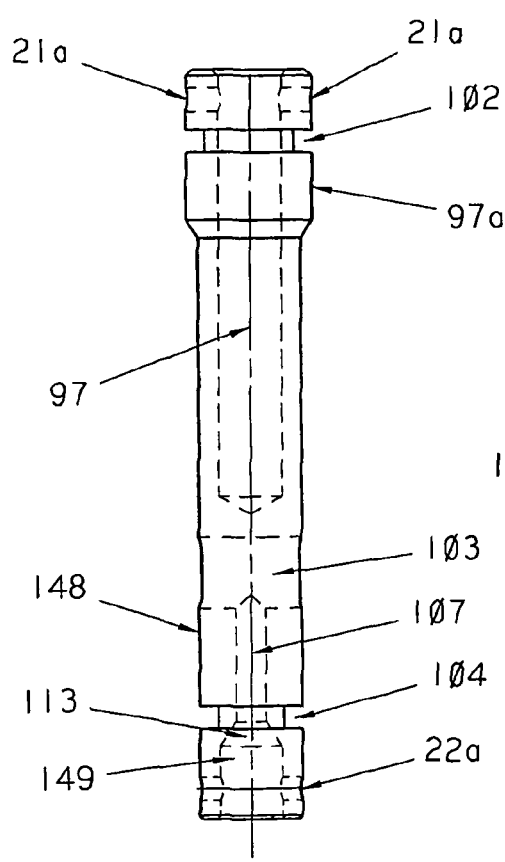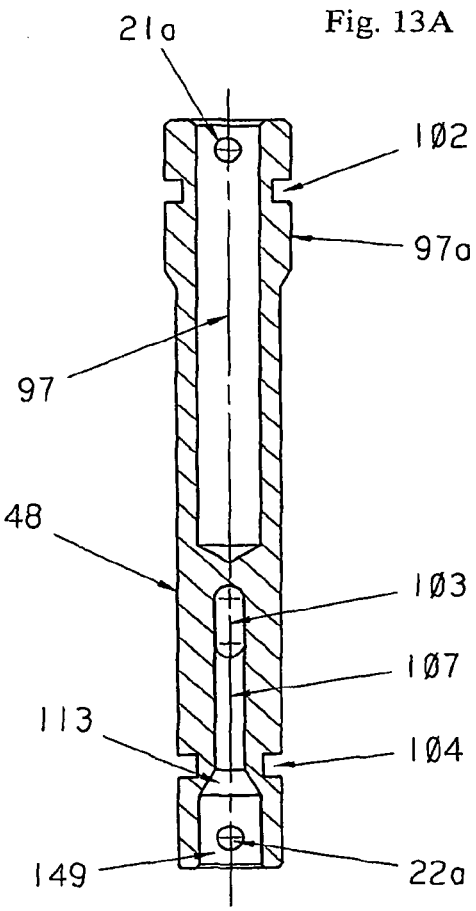
Fig. 13B
Fig. 13A
Fig. 13D
Fig. 13C
SECTION A-A

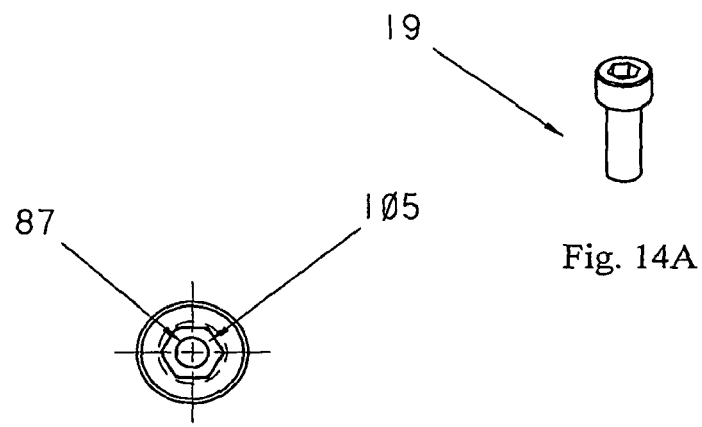
Fig. 14A
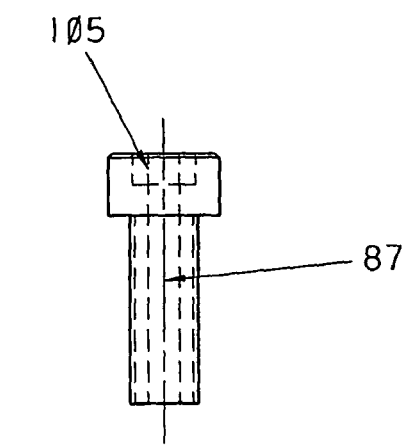
Fig. 14B
Fig. 14C

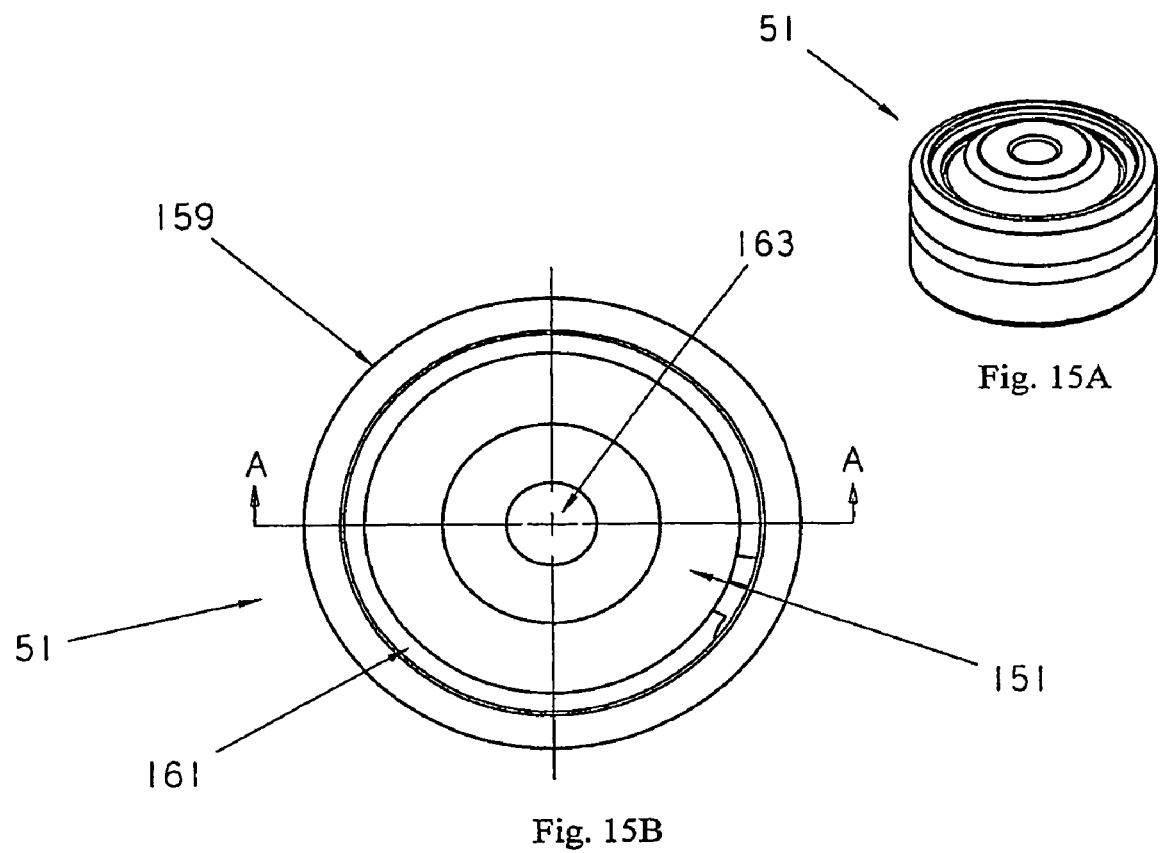
Fig. 15A
Fig. 15B
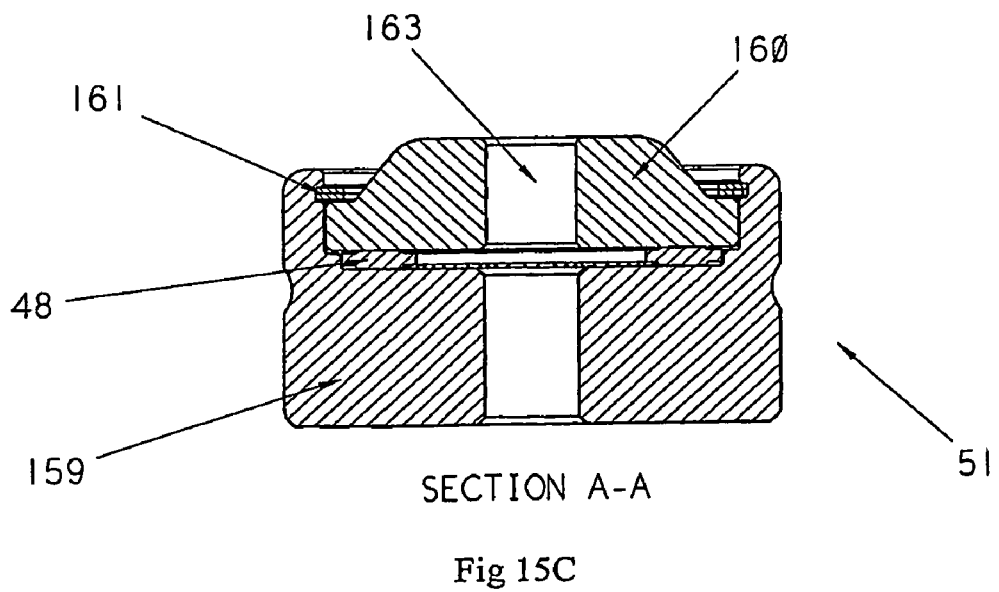
SECTION A-A
Fig 15C

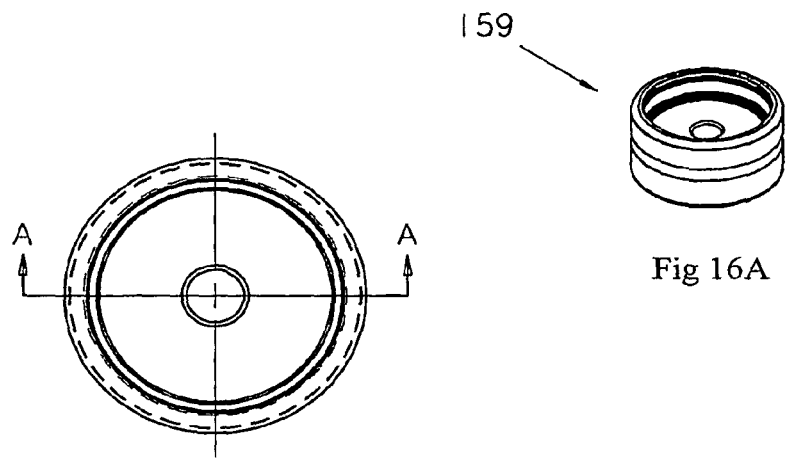
Fig 16A
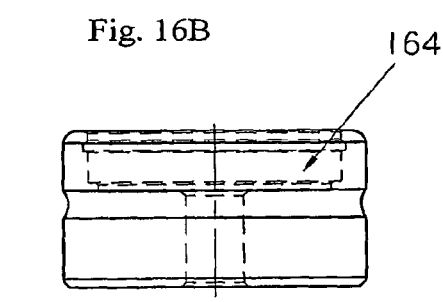
Fig. 16B
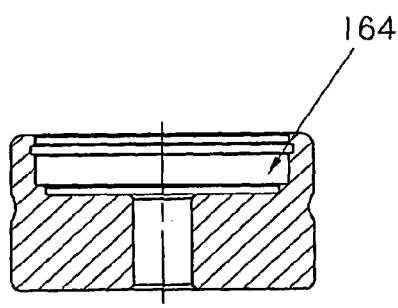
Fig 16C
SECTION A-A
Fig 16D

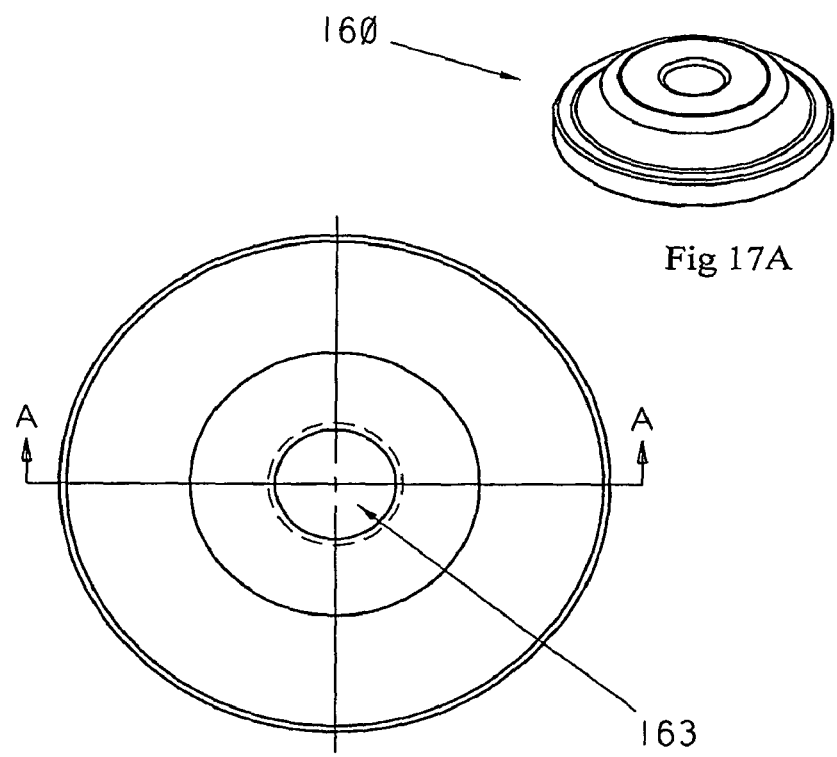
Fig 17A
Fig. 17B
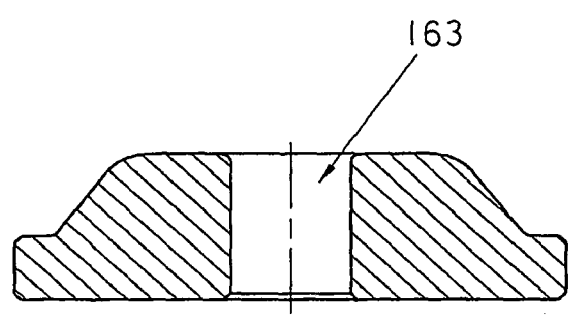
SECTION A-A
Fig. 17C

SECTION A-A

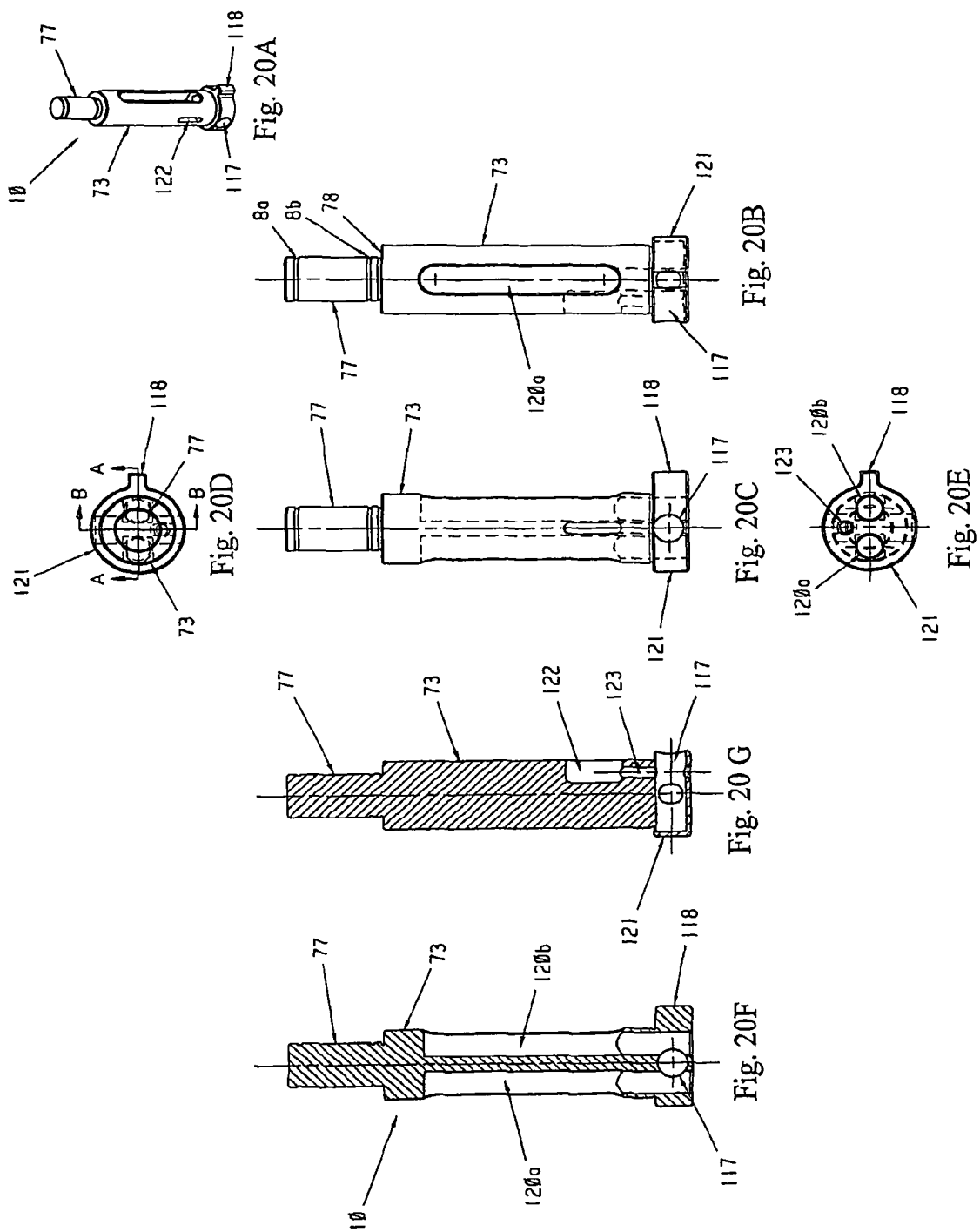

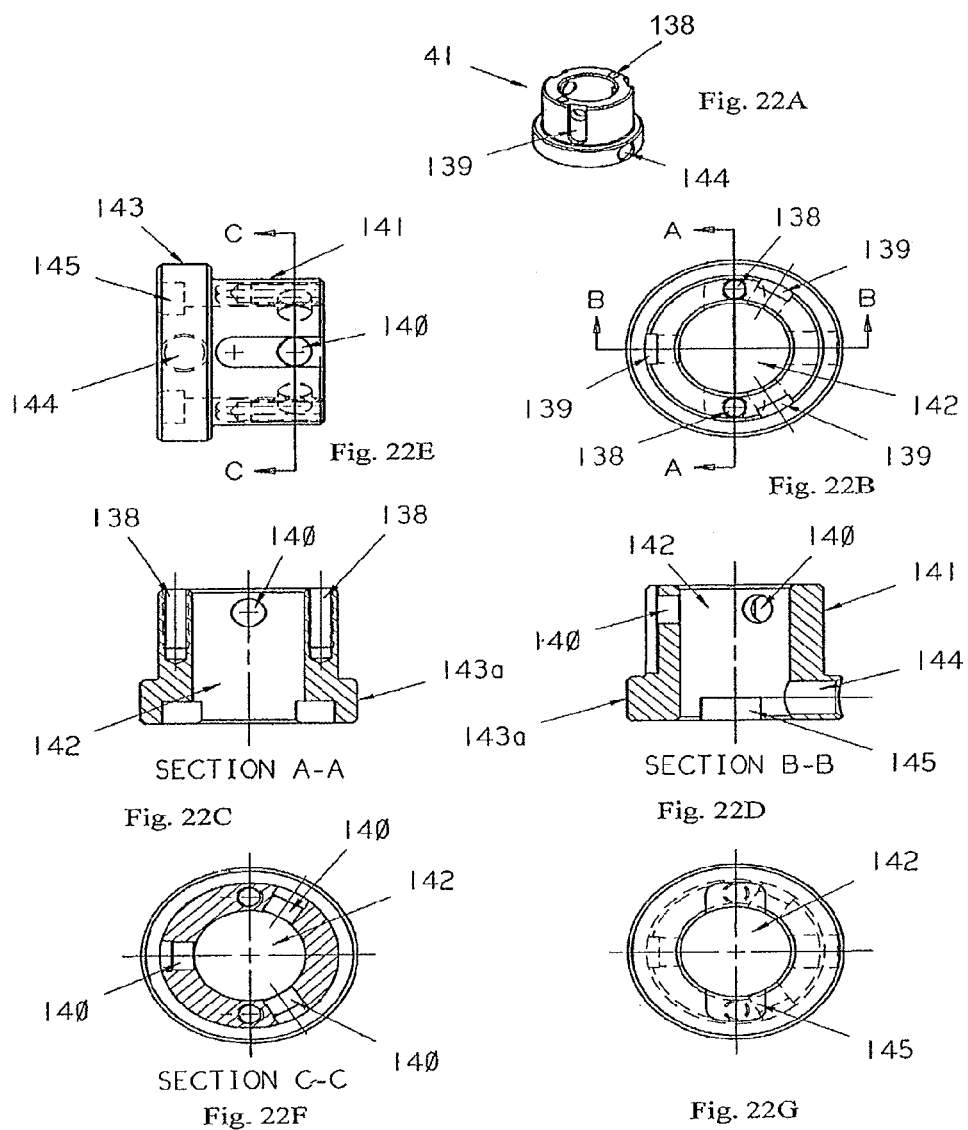

SECTION A-A

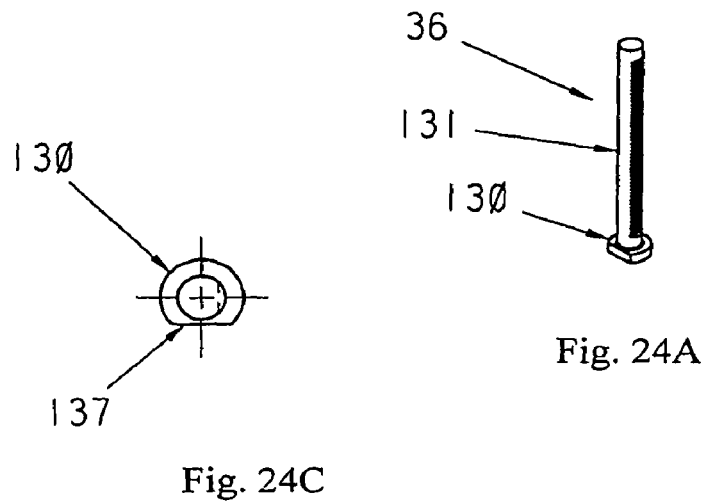
Fig. 24A
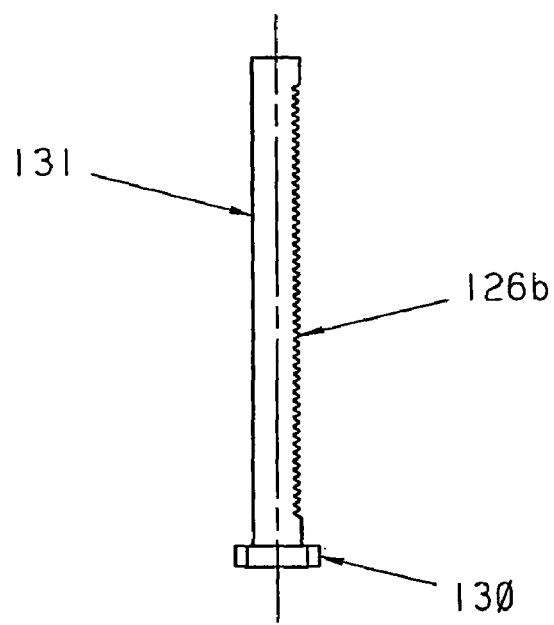
Fig. 24C
Fig. 24B

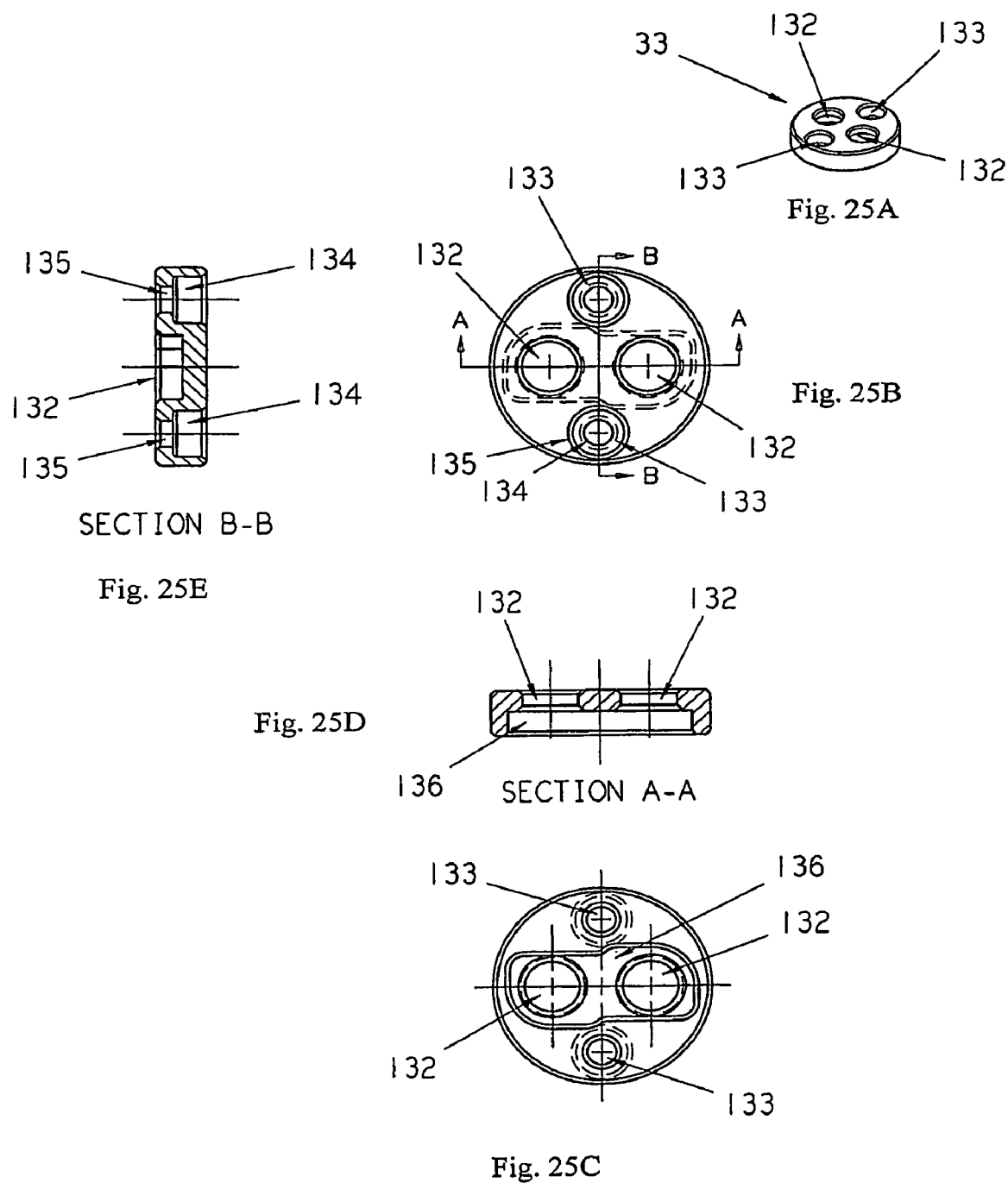

SECTION A-A

SECTION A-A

TAPPING TOOL

CROSS-REFERENCE TO RELATED APPLICATION

This application claims the benefit of pending U.S. provisional patent application No. 60/599,188 filed Aug. 4, 2004.

FIELD OF TECHNOLOGY

The tapping tool is for threading holes in a work piece.

BRIEF DESCRIPTION OF THE FIGURES

FIG. 7A is a perspective view of a guide body of the tapping tool of FIG. 4.

FIG. 7B is an elevation view of the guide body of FIG. 7A.

FIG. 7C is another elevation view of the guide body of FIG. 7A.

FIG. 7D is a cross-sectional plan view of the guide body of FIG. 7A taken along line C-C of FIG. 7C.

FIG. 7E is a top plan view of the guide body of FIG. 7A.

FIG. 7F is a cross-sectional elevation view of the guide body of FIG. 7A taken along line B-B of FIG. 7E.

FIG. 7G is a cross-sectional elevation view of the guide body of FIG. 7A taken along line A-A of FIG. 7E.

FIG. 7H is a cross-sectional close-up view of a portion of a lubrication chamber of the guide body of FIG. 7A taken at detail D of FIG. 7G.

FIG. 7I is a cross-sectional close-up view of a portion of the lubrication chamber of the guide body of FIG. 7A taken at detail E of FIG. 7G.

FIG. 7J is another elevation view of the guide body of FIG. 7A.

FIGS. 8A, 8B, and 8C. are respective perspective, top, and cross-sectional views of a head of the tapping tool of FIG. 4.

FIGS. 10A, 10B, 10C and 10D. are respective perspective, top, cross-sectional, and further cross-sectional views of a reservoir of the tapping tool of FIG. 4.

FIGS. 13A, 13B, 13C, and 13D. are respective perspective, top, cross-sectional, and elevation views of a lower plunge of the tapping tool of FIG. 4.

FIGS. 14A, 14B, and 14C. are respective perspective, top, and elevation views of a hollow cylinder cap screw of the tapping tool of FIG. 4.

FIGS. 15A, 15B, and 15C. are respective perspective, top, and cross-sectional views of a die assembly for use with the tapping tool of FIG. 4.

FIGS. 16A, 16B, 16C, and 16D. are respective perspective, top, elevation, and cross-sectional views of a die body of the die assembly of FIGS. 15A-15C.

FIGS. 17A, 17B, and 17C. are respective perspective, top, and cross-sectional views of a lower insert of the die assembly of FIGS. 15A-15C.

FIG. 20A is a perspective view of a driver of the tapping tool of FIG. 4.

FIG. 20B is an elevation view thereof.

FIG. 20C is another elevation view thereof.

FIG. 20D is top view thereof.

FIG. 20E is a bottom view thereof.

FIG. 20F is a cross-sectional view thereof taken along line A-A of FIG. 20D.

FIG. 20G is a cross-sectional view thereof taken along line B-B of FIG. 20D.

FIG. 22A is a perspective view of a collet holder of the tapping tool of FIG. 4.

FIG. 22B is a top view of the collet holder of FIG. 22A.

FIG. 22C is a cross-sectional view thereof taken along line A-A of FIG. 22B.

FIG. 22D is a cross-sectional view thereof taken along line B-B of FIG. 22B.

FIG. 22E is a side view of the collet holder of FIG. 22A.

FIG. 22F is a cross-sectional view thereof taken along line C-C of FIG. 22E.

FIG. 22G is a bottom view of the collet holder of FIG. 22A.

FIGS. 24A, 24B, and 24C. are respective perspective, top, and elevation views of a core pin of the tapping tool of FIG. 4.

FIGS. 25A, 25B, 25C, 25D, and 25E. are respective perspective, top, bottom, cross-section, and cross-section views of a core pin holder of the tapping tool of FIG. 4.

DESCRIPTION OF EMBODIMENT

Figure 1:
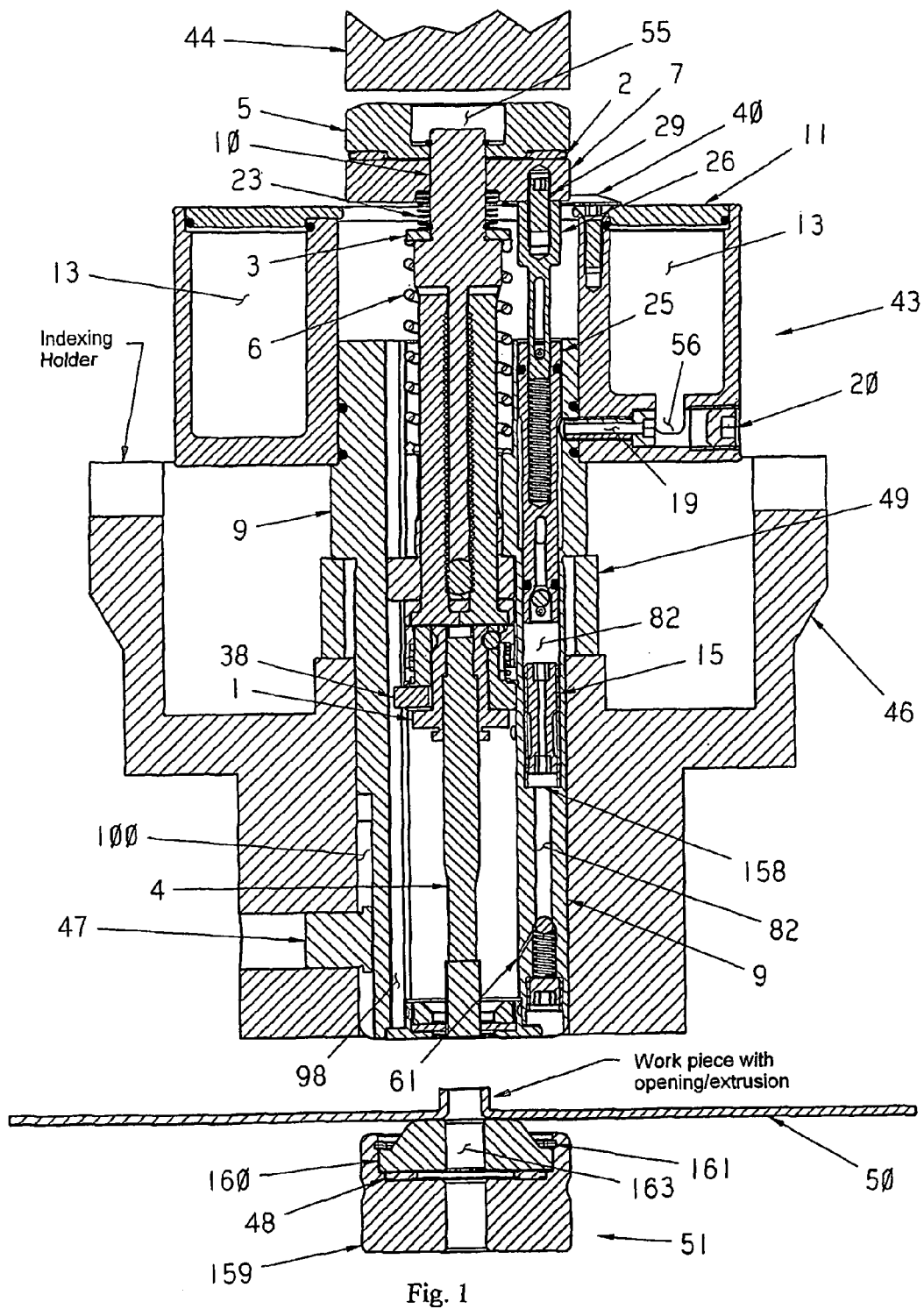
FIG. 1 is a cross-sectional view of a tapping tool arranged in a holder and in an at rest position.

The tapping tool 43 described in this specification is used to thread holes in a work piece 50. A work piece can be any type of material, such as sheet metal. Holes are usually punched in a first operation and then threaded in a second operation. The tapping tool is designed to perform the second operation, usually in conjunction with a punch press 52 having a rotational or indexable station. The hole punching tool may be mounted at a first station on a punch press 52. The punch press may be programmed to automatically punch a single hole or a series of holes in a work piece. Tapping tool 43 may also be mounted on the same punch press 52 as is the hole punching tool, but at a second station. The punch press may also be programmed to automatically tap or thread a hole or a series of holes in a work piece. In this specification the verbs "tap" or "thread" may be used interchangeably to mean the act of threading a hole.

An embodiment of tool 43 mounts in a programmable auto-indexed punch press 52, such as a turret punch press. The ram speed of the press may also be programmable. Tool 43 is demountable from the punch press. Tool 43 can thread extruded or nonextruded pre-pierced holes. Embodiments of tool 43 are configured to operate in mechanical and hydraulic presses as well as CNC punch presses with programmable ram speed in place of a normal piercing station. Tapping tool 43 can also tap pierced holes at an angle to perpendicular.

An embodiment of tapping tool 43 accepts common collets, available world-wide. Some collet-tap arrangements are separate and others are dedicated combinations. One collet system is a "Bilz" brand collet holder which allows interchanging taps of varying diameters and pitches. The Bilz system is a dedicated combination of collet and tap. The "Bilz" brand collet and collet holder system uses a ball locking design.

Commonly available taps have sizes ranging from numbers 0 to 12 (or M1.6 to M8). Generally, the smaller the diameter of tap 4, the shorter is its length. An embodiment of tapping tool 43 requires the end of tap 4 to extend to the bottom of the guide body 9 of tapping tool 43 while at rest. The length of core pins 36 in driver 10 of tapping tool 43 are adjustable to accommodate these various tap lengths. Changing the length of core pins 36 is accomplished by actuating a push button through side openings 53 in guide body 9 of tapping tool 43, which allows the extension or retraction of core pins 36 to the degree necessary to accommodate the length of tap 4. Tap sizes that conform to DIN, ANSI, ISO, and JIS standards are at the correct position when the tap touches a flat surface on which the bottom of guide body 9 rests.

An embodiment of the tool 43 automatically ejects lubrication onto tap 4 during each tapping cycle. Lubrication is delivered from a refillable lubrication reservoir 13 to tap 4 by lubrication pump 45. Pump 45 is actuated by the downward thrust of ram 44 on head 5 of tapping tool 43. The level of lubrication in reservoir 13 can be monitored through a see-through port or through a reservoir entirely or partially constructed of see-through material, such as clear polycarbonate. Reservoir 13 is filled through a sealable lubrication filler cap 40 on reservoir 13. The quantity of lubrication dispensed to tap 4 during each tapping cycle may be adjustable.

Other features or functions of an embodiment of tapping tool 43 described in this specification are the ability to: (i) tap a wide range of material types and thicknesses, (ii) form a rolled thread, (iii) meet 2B or other thread specifications, (iv) provide missing hole protection, and (v) direct lubrication that has dripped on the work piece back onto tap 4.

Tapping tool 43 is usually made of machined solid billet steel, but may also be made of other materials.

Description of Tapping Tool and Operation

Figure 2:
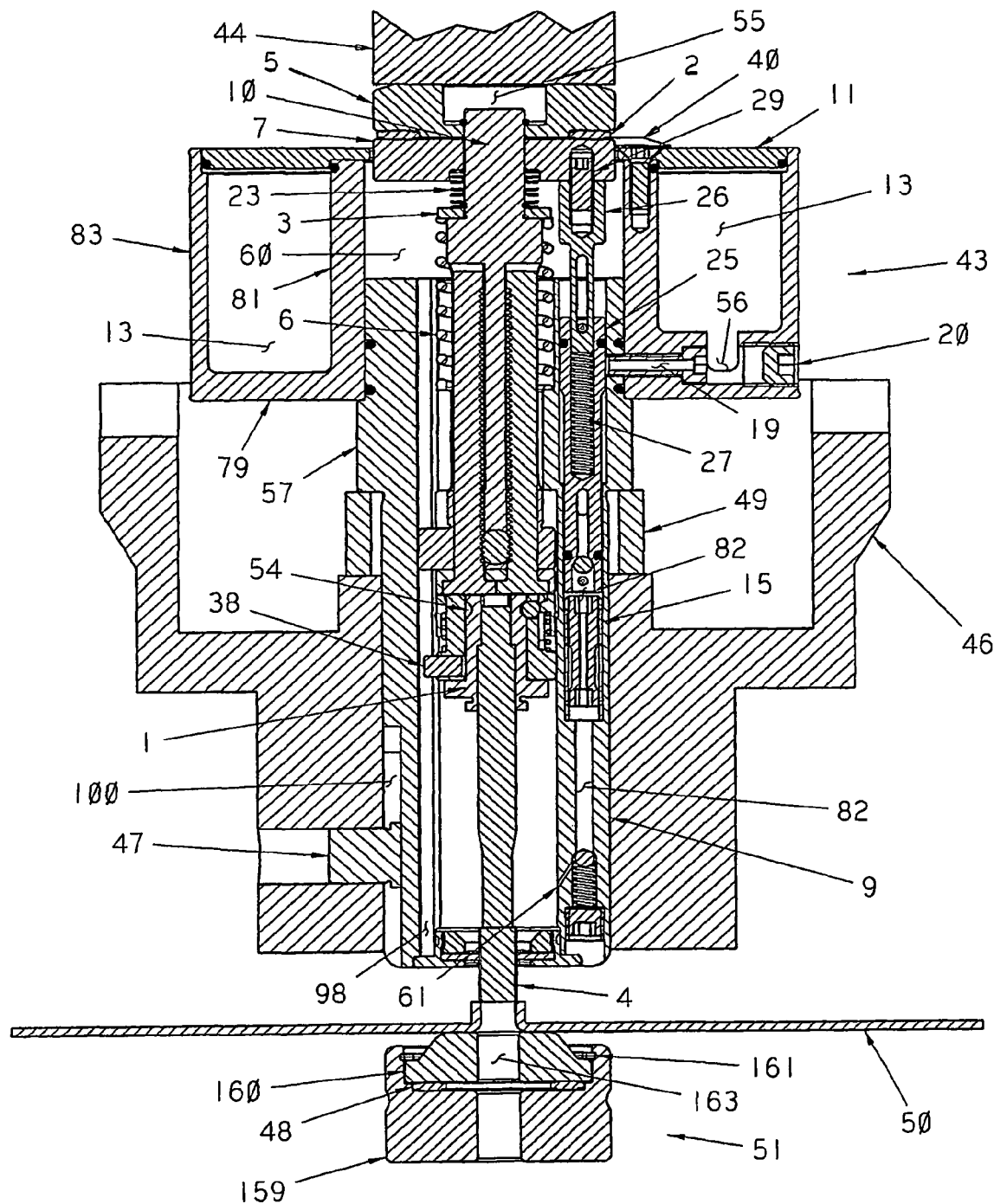
FIG. 2 is a cross-sectional view of the tapping tool and holder of FIG. 1 with the tapping tool positioned at a lip of a hole to be tapped.
Figure 3:
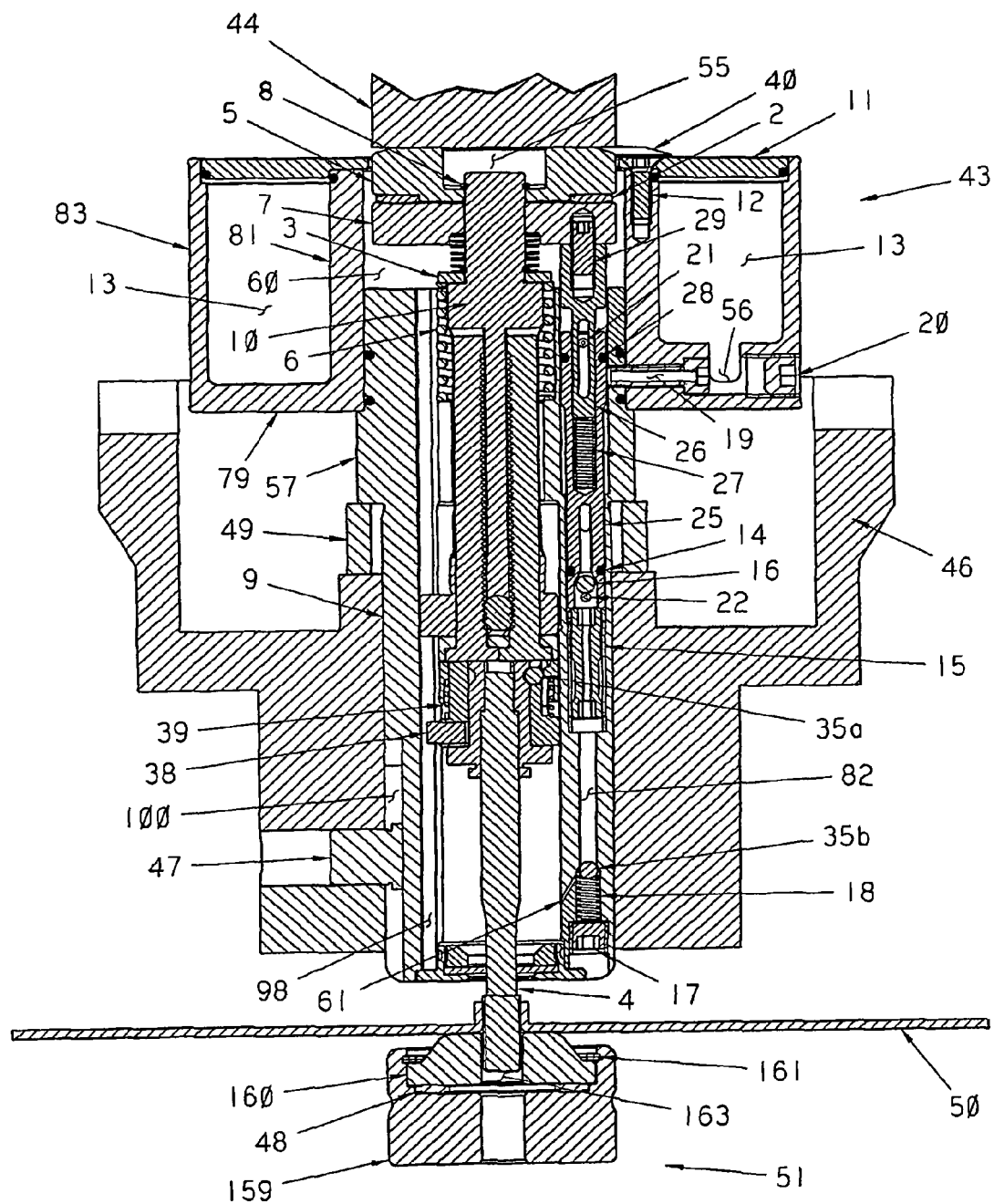
FIG. 3 is a cross-sectional view of the tapping tool and holder of FIG. 1 with the tapping tool positioned through a tapped hole.

FIGS. 1, 2, and 3 are cross-sectional views of an embodiment of tapping tool 43. The figures show tool 43 in three operating positions and in the context of the environment in which tool 43 is used. FIG. 1 illustrates tapping tool 43 in an "at rest" position, poised over the hole to be tapped. FIG. 2 illustrates the tool at the lip of a hole to be tapped. FIG. 3 shows the tapping tool at the point where the hole is fully tapped, poised for removal from the tapped hole, and ready to retract to its at rest position.

In FIG. 1, tool 43 begins its cycle of tapping a hole in a work piece 50 when ram 44 moves downward towards head 5 of tool 43 and makes contact with the top of head 5. As ram 44 begins its downward movement, the turret press rotates indexing holder 46. Indexing holder 46 is an integral part of the press and rotates within the press. Tapping tool 43 is removably fixed in indexing holder 46, so that rotation of holder 46 is imparted to tapping tool 43, without slippage. Tool 43 is removably fixed in the indexing holder 46 by inserting the bottom of guide body 9 into the top of indexing holder 46. Tool 43 has guide body keyway 100 which extends upward from the bottom of the outer wall of guide body 9. The top end of keyway 100 is closed and the bottom end is open. Indexing holder 46 has an indexing holder key 47 that mates with guide body keyway 100. Upon insertion of the guide body 9 into indexing holder 46 the guide body and key 47 are lined up so that key 47 enters the guide body keyway 100. In this manner the guide body is rotationally engaged with the indexing holder 46 and in operation the guide body rotates at the same speed as does indexing holder 46. Alternatively, keyway 100 may be in indexing holder 46 and key 47 may be in guide body 9. Tap 4 is keyed rotationally to guide body 9 by dowel pin 38, shown in FIG. 6. Dowel pin 38 rides in driver keyway slot 98.

The combination of head 5, thrust bearing 2, thrust bearing washer 7, and thrust washer 3 disengages the nonrotating, axial downward moving ram 44 from the rotational movement of tapping tool 43, including driver 10, guide body 9, and indexing holder 46. Among other unwanted effects of rotationally moving tapping tool 43 in contact with the nonrotating, vertical moving ram 44 is galling of the bottom the striking surface of ram 44. The thrust bearing elements remove this problem.

Typically, the rotational speed of indexing holder 46 is constant and the downward ram speed can be decreased for taps with less steep pitch and increased for taps with steeper pitch.

FIG. 2 illustrates tapping tool 43 in a position poised for tapping a hole in work piece 50. As illustrated in FIG. 2, the downward movement of ram 44 exerts a downward force on head 5. Downward moving head 5 compresses compliance spring 23 and drives driver 10 downward. The downward movement of driver 10 also compresses return coil spring 6. And driver 10 causes tap 4 to travel axially downward.

The downward force of ram 44 on head 5 drives upper plunger pin 26 downward, which compresses coil spring 27. Coil spring 27 is housed in lower plunge pin receiver cylinder 97 in lower plunge pin 25. Upper plunge pin 26 activates lubrication pump 45 for injection of lubrication onto tap 4. The injected lubrication may be lubrication commonly used in the machine tool industry to reduce cutting friction and for cooling during a machining operation.

Guide body 9 has moved from its initial at rest position shown in FIG. 1 to it's "begin to tap" position shown in FIG. 2. In the "begin to tap" position, tap 4 contacts the top of the hole to be threaded.

When the press is programmed, the downward speed of the ram is set to best match the pitch of tap 4. However, the ram speed of most presses cannot be set with precision and the speed of the indexable holder 46 is not a programmable feature for today's presses. Therefore, to avoid possible damage to tap 4, some compliance in tapping tool 43 is required. This compliance is created by compliance spring 23 on driver 10. It allows less strict control of the downward speed of ram 44 relative to the rotational speed of indexing holder 46. Providing a means for compliance allows tapping tool 43 to be used in both mechanical and hydraulic presses as long as ram speed and/or indexable holder rotational speed are programmable to accommodate different tap thread pitches. Compliance spring 23 is also chosen to provide enough compliance to prevent damage to the tap 4 if it encounters a missing pre-pierced hole.

At the begin to tap position, ram 44, driver 10, and tap 4 continue their downward movement. As the tap enters the hole it continues to rotate and taps the hole.

The distance between the top end of driver 10 and the top end of head 5 should be somewhat less than the distance between the bottom end of thrust bearing washer 7 and the top end of thrust washer 3 when compliance spring 23 is fully compressed, so that the top end of driver 10 does not contact the bottom face of ram 44. Well 55 provides this distance and yet allows the outer periphery of the top of head 5 to contact the bottom of the ram when the ram strikes.

As previously mentioned, contact between the nonrotating ram and rotating driver 10 can cause galling on the bottom surface of ram 44. Retaining ring 8 retains head 5 on axial driver pin end 77, but allows head 5 to move downward over axial driver pin end 77 to compress compliance spring 23.

Figure 18A:
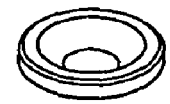
FIGS. 18A, 18B, and 18C. are respective perspective, top, and cross-sectional views of a retaining ring of the die assembly of FIGS. 15A-15C.
Figure 18B:
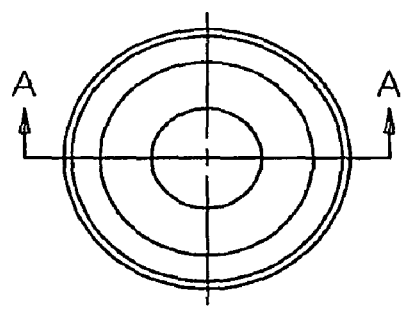
Figure 18C:

As shown in FIGS. 1-3, work piece 50 is backed-up by die assembly 51. Die assembly 51 provides lateral positioning for tap 4 as it threads work piece 50. It also provides back-up of work piece 50 so that the downward force of tap 4 has less chance of downward deformation of work piece 50. Die assembly 51 is shown in FIGS. 15A-C. FIG. 15A is a perspective of die assembly 51. FIG. 15B is a top view of assembly 51. FIG. 15C is a cross-sectional view of assembly 51 taken along section line A-A of FIG. 15B. Die assembly 51 is comprised of lower insert 160, retaining ring 161, thrust bearing 48, and die body 159. Die body 159 has axial tap guide aperture 163. Die body 159 is affixed to a bed underlying work piece 50. Thrust bearing 48 is seated in die body cavity 164, shown in FIGS. 16C and D. Thrust bearing 48 allows die body 159 to rotate within indexing holder during tap insertion while lower insert 160 remains stationary against the bottom of the workpiece. Retaining ring 161 retains lower insert 160 and thrust bearing 48 in cavity 164. FIGS. 16A-D illustrate die body 159. FIGS. 17A and B and FIG. 18 illustrate lower insert 160.

FIG. 3 illustrates tapping tool 43 in its "end of tap" position. When ram 44 reaches its downward most position, the rotating station reverses its rotation from clockwise to counterclockwise. Ram 44 then begins its upward travel and lifter 49 of indexing holder 46 returns tapping tool 43 to its at rest position. Return coil spring 6 provides an upward force on driver 10 and tap 4 as tap 4 is reversed out of the threaded hole. When ram 44 reaches its upward most position it is out of contact with head 5. In this position, rotation of indexing holder 46 ceases. During upward travel of ram 44, upper plunge pin 26 and lower plunger pin 25 return to their initial positions with the assist of return coil spring 27.

Figure 4:
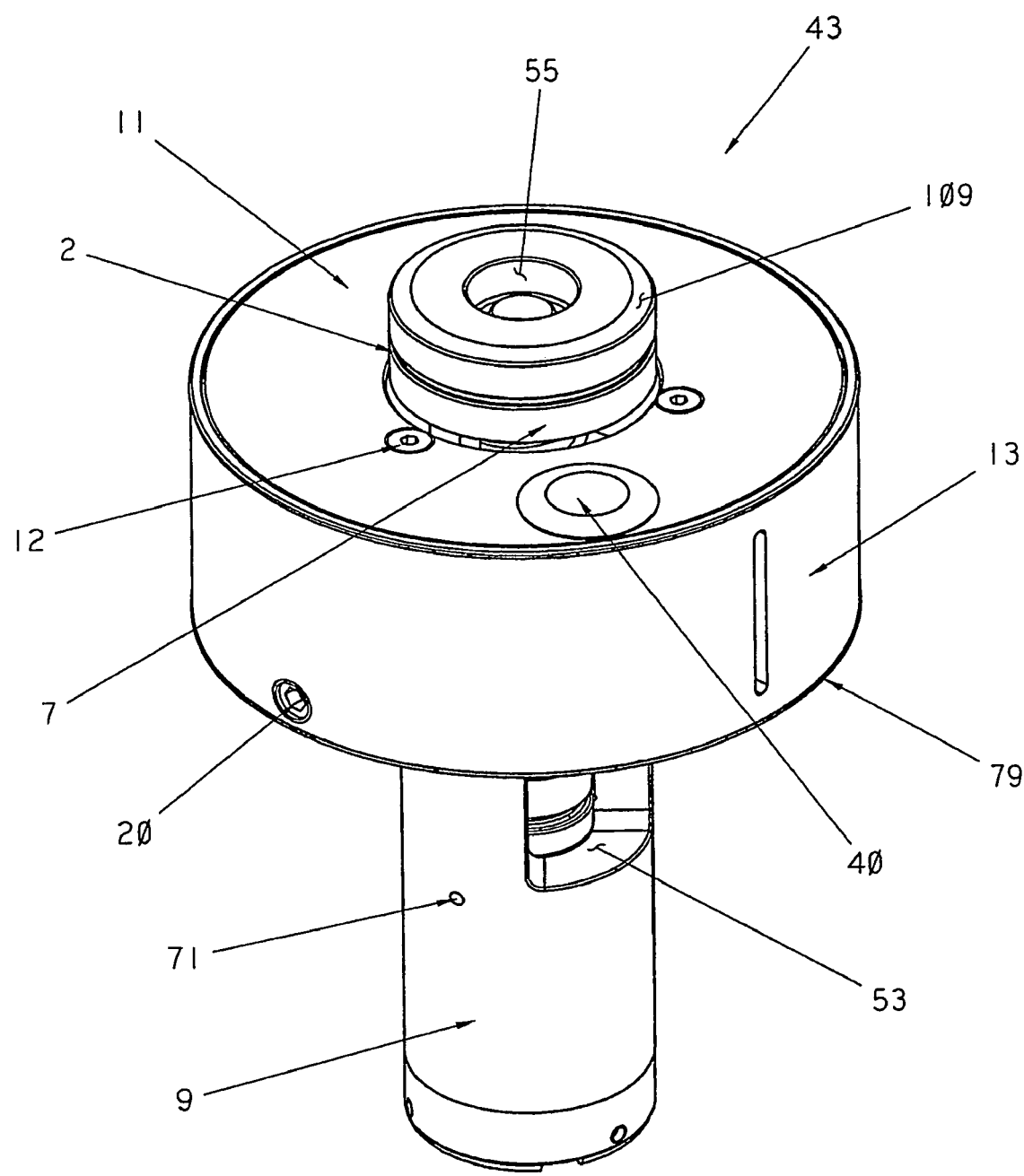
FIG. 4 is a perspective view of the tapping tool of FIG. 1 free of the holder.
Figure 5:
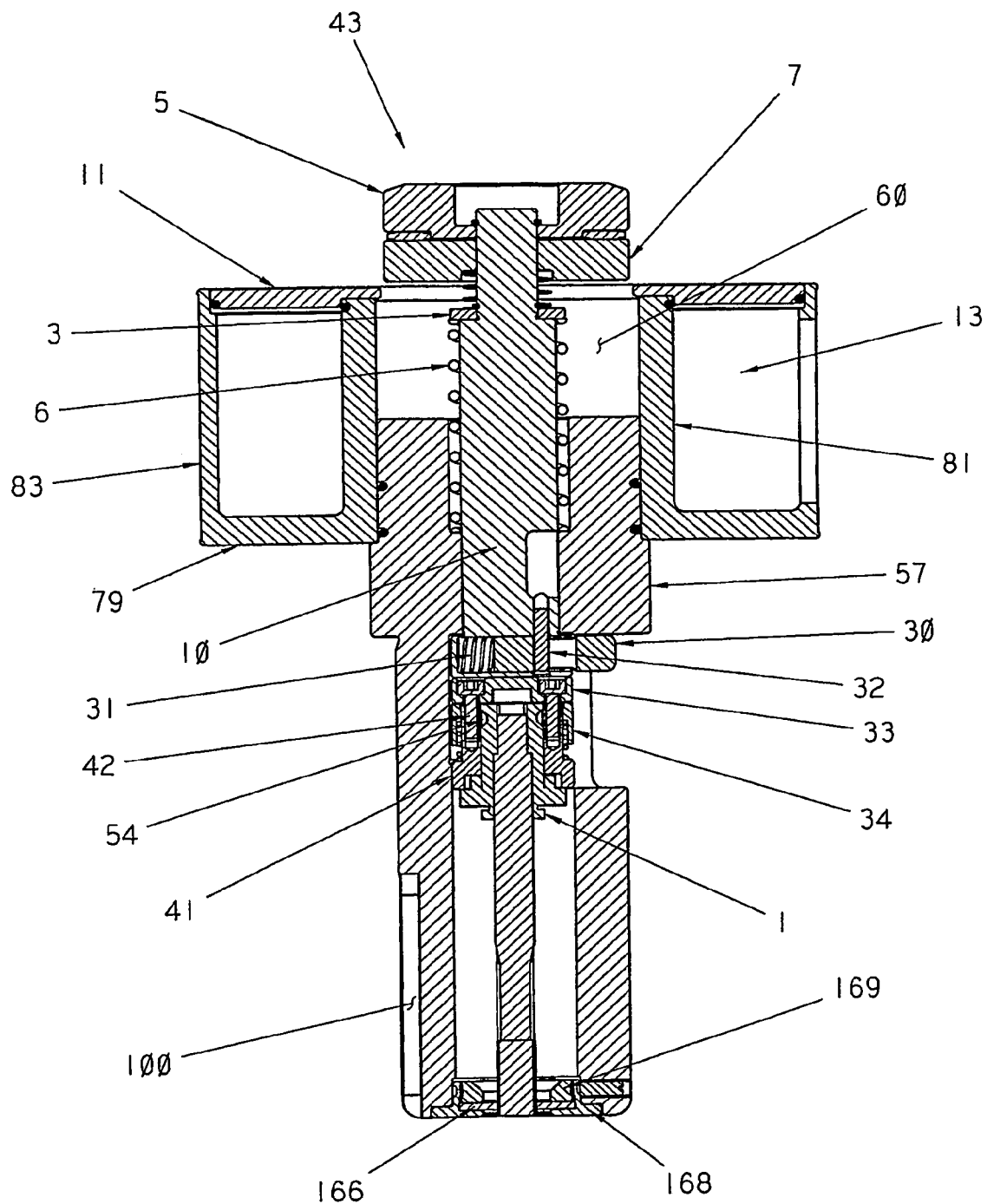
FIG. 5 is a cross-sectional view of the tapping tool of FIG. 4.

FIG. 4 is a perspective view of tapping tool 43. FIG. 5 is a cross-sectional view of tapping tool 43 taken along section line A-A of FIG. 1. Punch press ram 44 contacts head 5 for axial movement of a forming tap 4 towards a work piece 50. Head 5 provides a bearing surface to receive the axially directed force generated by the punch press. The upper end of driver 10 is in alignment with the axis of tapping tool 43. It extends into well 55. Head 5 is retained on driver pin end 77, which is located on the upper portion of driver 10, by retaining ring 8a. The retaining ring arrests upward movement of head 5 relative to driver pin end 77, but not downward movement of head 5. As the ram strikes head 5, the head moves downward on pin end 77 through thrust bearing 2, thrust bearing washer 7, compliance spring 23, and thrust washer 3, and into shoulder 78 of driver 10. Driver 10 moves downward within guide body 9 and extends tap 4 out of guide body 9 and into work piece 50. Upon contact with the ram, the top surface of pin end 77 rises to a position in well 55 below the upper surface of head 5, so that the driver pin does not come into contact with ram 44. The combination of head 5, thrust bearing 2, thrust bearing washer 7, compliance spring 23, and thrust washer 3, restrain driver 10 from contact with the ram and thereby isolates the ram from the rotating motion of tapping tool 43. Tool 43 is rotated by upper indexing holder 46 of the punch press. Upper indexing holder 46 rotates within the punch press. But the combination also allows the downward ram force of the ram to be transmitted to driver 10.

Surrounding guide body 9 at the upper end of tapping tool 43 is lubrication reservoir 13. The lubrication most generally used is cutting lubrication for lubrication and cooling forming tap 4 used during the threading operation. Lubrication reservoir is illustrated in FIGS. 1, 2, 4-6, 10, and 11.

Reservoir 13 has an annular outer wall 83. Reservoir cover 11 is affixed to the top of reservoir 13 by three cap screws 12, two of which are visible in FIG. 1. Reservoir 13 is filled through filler cap 40 in reservoir cover 11. The reservoir may have a viewing window for checking the level of lubricant. Alternatively, the reservoir may be in part or wholly fabricated from a transparent material such as clear polycarbonate.

Access port cap screw 20 (FIG. 1) is threaded into access port 56. Reservoir 13 provides lubrication for tap 4 and work piece 50 during tapping. Access port 56 extends radially through base 79 of reservoir 13. Access port 56 extends from outside reservoir 13 into the interior of reservoir 13, through interior annular side wall 81 of reservoir 13, and through upper guide body wall 80 into lubrication chamber 82. Hollow cylinder cap screw 19, shown in FIGS. 14A-C is inserted into that portion of the access port 56 in interior annular side wall 81 and is threaded into guide body wall 80. Hollow cylinder cap screw 19 has a longitudinal bore 87, which provides a passageway for lubrication to travel from the reservoir to lubrication chamber 82. Hollow cylinder cap screw 19 is threaded into lateral aperture 70 in upper guide body wall 80. It may have a hex hole 105 for insertion or removal from upper guide body wall 80 by use of an allen wrench. FIG. 14 illustrates hollow cylinder cap screw 80.

Annular saddle shaped reservoir 13 rests on annular shoulder 57 (FIG. 5) of guide body 9. It is removably affixed to upper segment 88 (FIG. 7A) of guide body 9 by hollow cylinder cap screw 19 (shown in FIG. 6). The upper segment of guide body 9 is inserted into reservoir receiving cylinder 60 and through cover receiving aperture 68 (FIG. 11C). until the reservoir is seated against shoulder 57 (FIG. 7). Hollow cylinder cap screw 19 is inserted through access port 56 and threaded into guide body wall 80 of upper segment 88.

Reservoir 13 is further illustrated in FIGS. 10A-D. FIG. 10A is a perspective view of reservoir 13. FIG. 10B is a top plan view of reservoir 13. FIG. 10C is an elevational view of reservoir 13 taken along section line A-A of FIG. 10B. FIG. 10D is an elevational view of reservoir 13 taken along section line B-B of FIG. 10B. Among other features of the reservoir, FIGS. 10A-D show cap screw threaded holes 65.

Figure 11A:
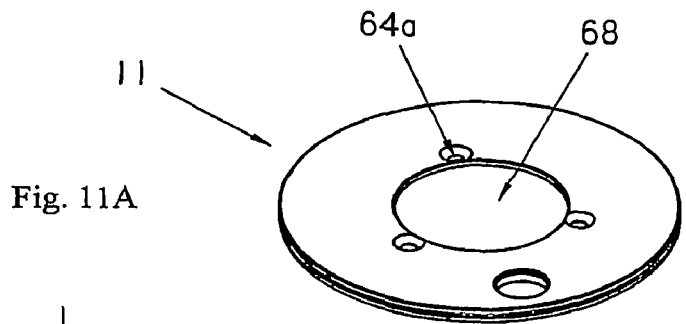
FIGS. 11A, 11B, and 11C. are respective perspective, top, and cross-sectional views of a reservoir cover of the tapping tool of FIG. 4.
Figure 11B:
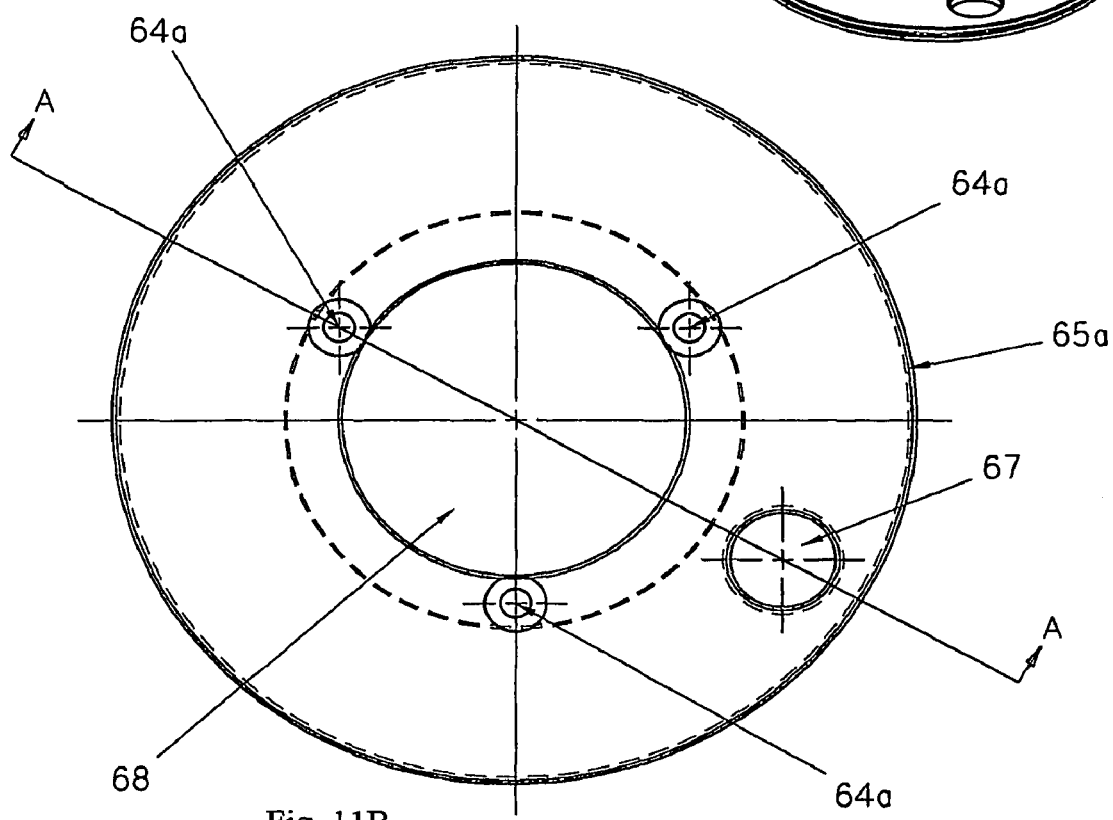
Figure 11C:
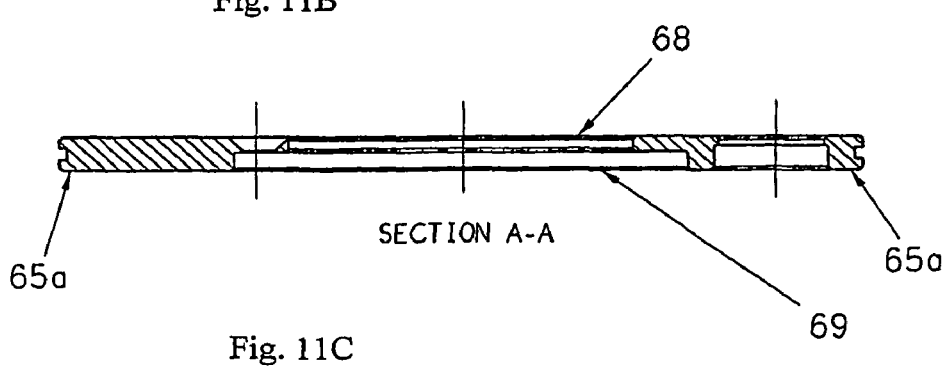

Reservoir cover 11 is illustrated in FIGS. 11A-C. FIG. 11A is a perspective view of cover 11. FIG. 11B is a top plan view of cover 11. FIG. 11C is an elevational view of reservoir 13. Another feature of cover 11 is its receiving aperture 68, which allows the upper segment 88 of guide body 9 to pass through cover 11. "Cap screw holes 64 allow cap screws 12 to pass through cover 11 for threaded engagement with reservoir 13. The lubrication filler cap aperture is shown at 67. Seat 69 for engagement with interior annular wall 81 of reservoir 13 is also shown.

FIG. 7A is a perspective view of guide body 9. Guide body 9 is a hollow cylindrical body comprising upper segment 88, which includes annular shoulder 57, lubrication chamber 82, dowel pin aperture 86, lateral aperture 70, and reservoir insert 91. Guide body 9 is also comprised of lower segment 89. Side window 53 is also located in lower segment 89. The top of annular shoulder 57 abuts against reservoir base 79. Reservoir insert 91 is inserted into reservoir receiving cylinder 60 to the point where reservoir base 79 abuts annular shoulder 57. Reservoir base 79 must be rotated so that dowel pin slot 58 in the base of reservoir 13 is aligned with dowel pin 24. Prior to insertion, dowel pin 24 is affixed into dowel pin aperture 86 (located in upper segment 88 of guide body 9).

In lower segment 89, dowel pin 37 inserts into dowel pin aperture 71. Dowel pin aperture 71 intercepts lubrication chamber 82. Dowel pin 37 limits the upward travel of adjustable stand-off 15.

FIG. 7B is a first elevation view of guide body 9. It shows the entrance through lateral aperture 70 to lubrication chamber 82 in upper segment 88. Vertical lubrication dowel pin aperture 71, side window 53, and indexing keyway 100 are in lower segment 89. There may be two side windows 53. Side windows 53 provide access to collet 1 for change of tap 4.

FIG. 7C is a second elevation view of guide body 9. FIG. 7C illustrates guide body 9 rotated 90 degrees from the guide body in FIG. 7B with side window 53.

FIG. 7D is a plan view of guide body 9 along section line C-C of FIG. 7C. It illustrates driver keyway slot 98, driver cylinder 96, lubrication chamber 82, annular shoulder 57, side window 53, driver column shoulder stop 114. Vertical lubrication passageway 82 extends longitudinally through the entire length of guide body 9.

FIG. 7E is a top plan view of guide body 9. It illustrates coil spring retention shoulder 94, the upper opening of lubrication chamber 82, annular shoulder 57, and driver keyway slot 98.

FIG. 7F is a third elevational view of guide body 9 along section line B-B of FIG. 7E. FIG. 7F illustrates, in guide body upper segment 88, well 90, coil spring retention shoulder 94, dowel pin aperture 86, and annular shoulder 57.

Running through both upper segment 88 and lower segment 89 of guide body 9 is driver keyway slot 98. Keyway slot 98 is parallel to the axis of guide body 9. It extends laterally into the wall of driver cylinder 96. It mates with driver key 118, and restrains driver 10 from rotation within guide body driver cylinder 96. Side window 53 is also shown in lower segment 89.

Well 90 extends from the top of guide body 9 to coil spring retention shoulder 94. Coil spring 6 is axially aligned over driver column 73 and is retained on its top by thrust washer 3 and on its bottom by coil spring retention shoulder 94. Well 90 of guide body 9 opens at its bottom into driver cylinder 96. Driver cylinder 96 is in axial alignment with well 90.

FIG. 7G is a fourth elevational view of guide 9 body along section line A-A of FIG. 7E. FIG. 7G illustrates details of lubrication chamber 82, which extends from the top to the bottom of guide body 10. Lubrication ejector 61 is projecting from lubrication chamber 82 at a downward angle from the chamber into driver cylinder 96. Lubrication injector 61 sprays lubrication downwards towards tap 4 out of lubrication chamber 82. The point of injection of the lubrication is in the vicinity of forming tap 4. The point of injection is also at the bottom of lubrication chamber 82.

Shoulder 158 in lubrication chamber 82 is a stop for adjustable stand-off 15. Adjustable stand-off 15 controls the amount of lubricant contained in lubrication chamber 82 and thereby the amount that is ejected onto tap 4. Indexing keyway 100 is on lower segment 89 in outside wall of guide body 9. Indexing keyway 100 extends from below side window 53 to the bottom of guide body 9. Indexing keyway 100 mates with and receives key 47 of indexing holder 46, which translates rotation of indexing holder 46 to tapping tool 43. Lateral aperture 70 is also shown.

FIG. 7H is a view of Detail D of FIG. 7G. It illustrates the portion of lubrication chamber 82 below ejector inlet 115 of ejector 61. Steel ball 35b sits adjacent ejector inlet 115 in lubrication chamber 82 so that ball 35b is covering ejector inlet 115. Coil spring 18 is below steel ball 35b and set screw 17 is below coil spring 18. Set screw 17 retains coil spring 18 and ball 35b in lubrication chamber 82. As ram 44 drives head 5 downward lubrication pump 45 forces lubrication into the lower portion of lubrication chamber 82. Hydraulic action of the lubrication forces ball 35b downward against coil spring 18 and opens ejector inlet 115. An aliquoted portion of lubrication flows through ejector outlet 116 onto tap 4.

FIGS. 8A, B, and C are details of head 5. FIG. 8A is a perspective view of head 5. FIG. 8B is a plan view of the top of head 5. FIG. 8C is a cross-sectional view taken along section line A-A, as of FIG. 8B. Driver pin through-hole 108 receives driver pin end 77 of driver 10. Thrust bearing seat 110 provides space for thrust bearing 2 to freely rotate. The edge of the outer periphery of the top surface of head 5 is beveled 109, which is also the case with most edges of the components of tapping tool 43 in conformance with best practices in the machine tool industry. The well of head 5 is shown at 55.

Figure 9A:
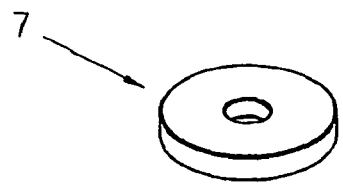
FIGS. 9A, 9B, and 9C. are respective perspective, top, and cross-sectional views of a thrust bearing washer of the tapping tool of FIG. 4.
Figure 9B:
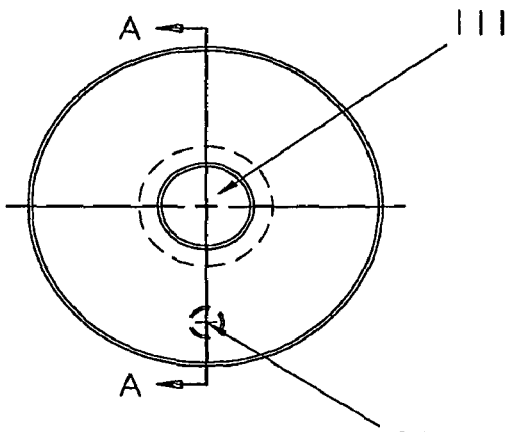
Figure 9C:
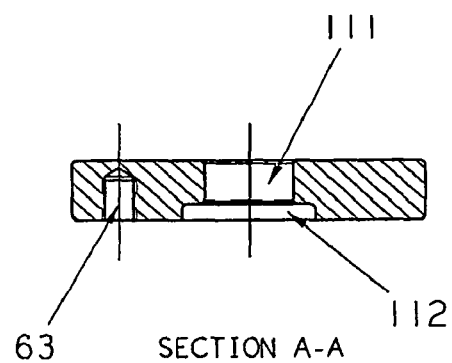

FIGS. 9A, B, and C are details of thrust bearing washer 7. FIG. 9A is a perspective view of washer 7. FIG. 9B is a plan view of the top of washer 7. FIG. 9C is a cross-sectional view taken along section line A-A, of FIG. 9B. A seat for retaining compliance spring 23 is shown at 112 and the driver pin through hole is at 111. Threaded aperture 113 mates with headless set screw 29 which connects to upper plunge pin 26.

FIGS. 20A, B, C, D, E, F, and G illustrate driver 10. FIG. 20A is a perspective view of driver 10. The upper segment of driver 10 is pin end 77. The middle segment is column 73. The lower segment, is key end 121. Pin end 77 extends above the top of guide body 9 and upward into thrust washer 3, compliance spring 23, thrust bearing washer 7, and into well 55 of head 5. Pin end 77 is retained in well 55 by retaining ring 8. Retaining ring 8 is retained in ring detent 8a. Thrust washer 3 is retained on pin end 77 by another retaining ring 8 retained in ring detent 8b.

Figure 21A:
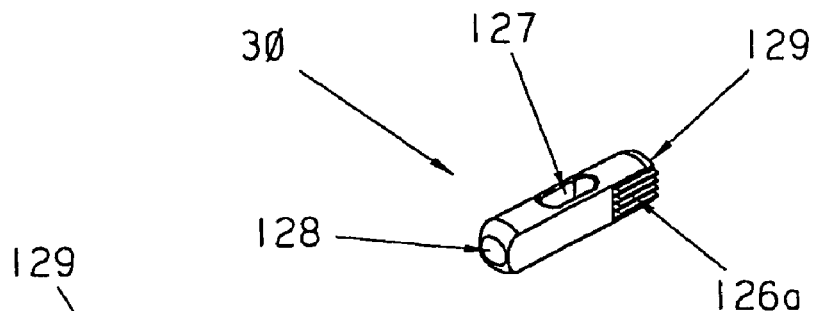
FIGS. 21A, 21B, and 21C. are respective perspective, elevation, and end views of a push button of the tapping tool of FIG. 4.
Figure 21B:
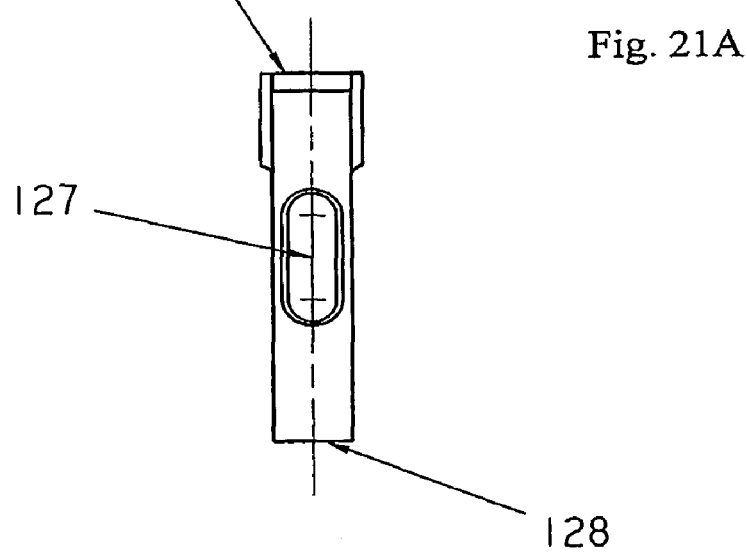
Figure 21C:
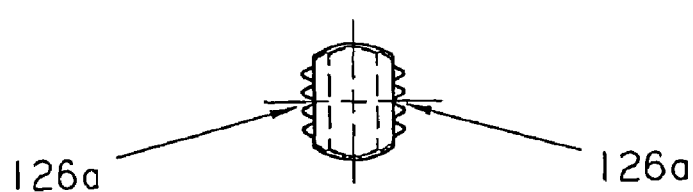

Driver column 73 has first core pin receiver 120a. A second core pin receiver 120b is opposite first receiver 120a. As shown in FIG. 20B the receivers open into the exterior outer wall of driver column 73, but could be closed. Core pin receivers 120a and b allow core pins 36, which are inserted into the receivers, to be extended up or down within key end 121 and column 73 of driver 10. FIG. 20E is a bottom view of driver 10 as shown in FIG. 20C. In it, the entrances to receivers 120a and b are shown as is aperture 123 for insertion of retaining dowel pin 32. Retaining dowel pin insertion access slot is shown at 122. Dowel pin 32 retains push button 30 in push button receiver 30a. Push button 30 is illustrated in detail in FIGS. 21A-C. FIG. 21A is a perspective view, which illustrates push end 128 of push button 30. The opposing spring end 129 contacts coil spring 31. Dowel pin 32 extends vertically through oval hole 127. In the locked position, dowel pin 32 abuts the wall of oval hole 127 closest to spring end 129.

When push button 30 is depressed, dowel pin 32 abuts the wall of oval hole 127 closest to push end 128. FIGS. 21A and C illustrate teeth 126a. Teeth 126a are on both sides of push button 30. When push button 30 is depressed to release core pins 36, teeth 126a on push button 30 become disengaged from mating teeth 126b on core pins 36. When force is released from push button 30, coil spring 31 returns the push button to its normal locked position and core pins 36 are locked in their new longitudinal positions by engagement of teeth 126a on button 30 with mating teeth 126b on core pins 36. FIG. 20D shows the top view of driver 10 shown in FIG. 20C. FIG. 20F is a cross-sectional view of driver 10 taken along section line A-A of FIG. 20D. FIG. 20G is a cross-sectional view of driver 10 taken along section line B-B of FIG. 20D.

FIGS. 24A-C illustrate core pin 36 of which there are two in this embodiment. FIG. 24A is a perspective view showing keyed head 130 and toothed pin 131 of core pin 36. FIG. 24B illustrates core pin teeth 126b for mating engagement with teeth 126a on push button 30. FIG. 24C illustrates key portion 137 for engagement with keyway 136 on core pin holder 33.

FIGS. 25A-E depict core pin holder 33. FIGS. 24A-C illustrate the core pins 36. FIG. 25A is a perspective view and FIG. 25B is a plan view of core pin holder 33 from the top side. FIGS. 25A-E show cap screw holes 133 and core pin aperture holes 132. The cap screws 42 retain core pin holder 33 to a collet holder 41, shown in FIGS. 22A-G. The head portion of cap screw 42 is seated in head portion hole 134 of cap screw hole 133. The threaded portions of cap screws 42 extend downwardly through the stud portion holes 135 of cap screw holes 133 and are threaded into threaded holes 138 in collet holder 41, shown in FIGS. 22A-G. Keyway 136 receives keyed heads 130 of core pins 36. Keyway 136 is sized to fit the configuration of keyed heads 130 to prevent rotation of core pins 36. FIG. 25C is a plan view of core pin holder 33 from the bottom side. FIGS. 25D and E are sectional views along sections lines A-A and B-B respectively of FIG. 25B.

Figure 23A:
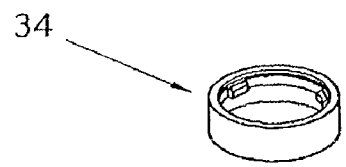
FIGS. 23A, 23B, and 23C. are respective perspective, top, and cross-sectional view of a collet holder retainer of the tapping tool of FIG. 4.
Figure 23B:
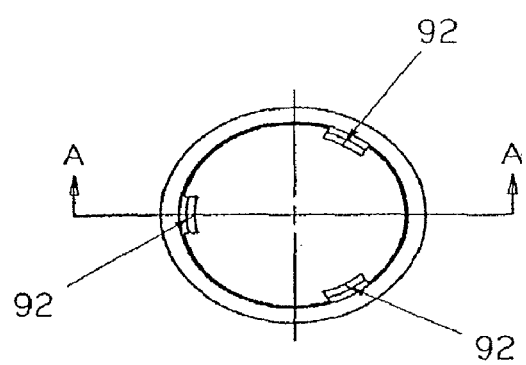
Figure 23C:
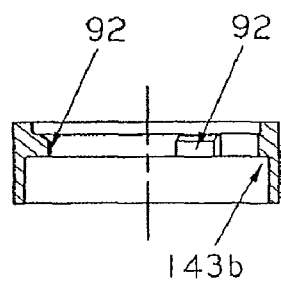

Collet holder retainer 34 is illustrated in FIGS. 23A-C. Positioning lugs 92 extend near the top end of the inside wall of retainer 34 and project towards the center of the retainer ring 34. Collet holder retainer 34 surrounds collet holder 41, shown in FIGS. 22A-G.

FIGS. 22A-G illustrates collet holder 41. FIG. 22A is a perspective view of collet holder 41. Positioning lugs 92 of collet holder retainer 34 ride in positioning guideways 139 of collet holder 41. Positioning lugs 92 are positioned at the top of positioning guideways 139. Bearing apertures 140 are also positioned near the top of positioning guideways 139. Bearing apertures 140 project radially from each positioning guideway 139 through the inner wall of collet holder 41. Steel balls 35a are fitted into each bearing aperture 140. The diameter of bearing apertures 140 at the inner wall is smaller than the diameter of steel balls 35a so that steel balls 35a are retained from falling out of bearing apertures 140 and into collet receiver 142. The diameter of bearing apertures 140 at the entry point in positioning guideways 139 is the same or slightly larger than the diameter of steel balls 35a so that steel balls 35a are easily placed in bearing apertures 140. Coil spring 39 surrounds the collet holder retainer portion 141 of collet holder 41. Coil spring 39 is retained on collet holder 41 by collet holder shoulder portion 143a and by inner shoulder 143b on collet holder retainer 34. Collet holder retainer 34 is retained on collet holder 41 by core pin holder 33. Coil spring 39 forces collet holder retainer 34 upwards so that positioning lugs 92 ride up on steel balls 35a and drive them radially into annular groove 54 FIG. 5) around the periphery of the inserted end of a collet 1, thereby holding collet 1 in collet holder 41.

Collet 1 is removed from collet holder 41 by exerting downward pressure on collet holder retainer 34 against coil spring 39 so that positioning lugs 92 move out of contact with steel balls 35 allowing steel balls 35 to move radially away from annular groove 54 on collet 1.

FIG. 22D shows dowel pin aperture 144 in shoulder portion 143a for receiving dowel pin 38. During operation of fully assembled tapping tool 43, dowel pin 38 is in mating engagement with driver keyway slot 98, which is located in guide body 9. Their engagement restrains rotation of collet holder 41 and driver 10 within guide body driver cylinder 96. As previously noted in this specification, mating engagement of driver key 118 with driver keyway slot 98 also restrains driver 10 from rotation within guide body driver cylinder 96. Moreover, the combination of driver key 118 and driver keyway slot 98 reduces radial twisting of core pins 36. Keying of driver 10 and collet holder 41 with guide body driver cylinder 96 serves the further purpose of reducing radial twisting of tap 4 relative to driver 10 during a tapping operation.

The diameter of shoulder portion 143 of collet holder 41 is substantially equal to the diameter of the driver cylinder 96 of guide body 9. This retards lateral movement of the collet holder 41 in driver cylinder 96 during vertical movement of driver 10 as do the substantially equal diameters of driver column 73 of driver 10 and driver cylinder 96 of guide body 9.

FIGS. 22C, E, and G illustrate butterfly keyways 145a and b for engagement with the mating collet keys on a collet 1, such as the collet manufactured by Bilz. Collet 1 is inserted into collet receiver 142, the diameters of which are substantially the same, and the steel balls 35a in collet holder 41 engage with the annular groove 54 in collet 1.

Although aspects of the lubrication pump 45 have been described in this specification, the entire lubrication pump 45 system has not been fully described. Lubrication pump 45 includes reservoir 13 (which has base 79, interior annual wall 81, exterior annual wall 83, cap screw holes 64b, receiving cylinder 60, access port 56, access port cap screw 20, dowel pin slot 58, cover receiver 65b, and hollow cylinder cap screw 19), reservoir cover 11 (which has cover shoulder 65a, lubrication filler cap aperture 67, lubrication filler cap 40, interior annual wall seat 69, cap screw holes 64a, cover receiving aperture 68, and cap screws 12), adjustable stand-off 15, lower plunge pin 25, upper plunge pin 26, ejector 61, ejector inlet 115, ejector outlet 116, upper plunge pin receiver 84, upper plunge pin receiver cylinder 62, lateral aperture 70, dowel pin aperture 71, dowel pin 37, and lubrication chamber 82.

Figure 12C:
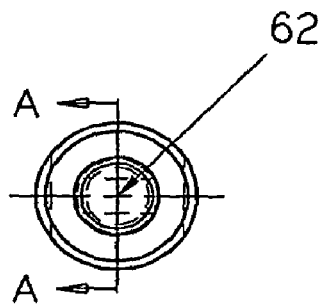
FIGS. 12A, 12B, 12C, and 12D. are respective perspective, elevation, top, and cross-sectional views of an upper plunge pin of the tapping tool of FIG. 4.
Figure 12A:
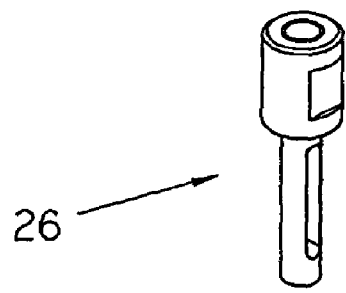
Figure 12B:
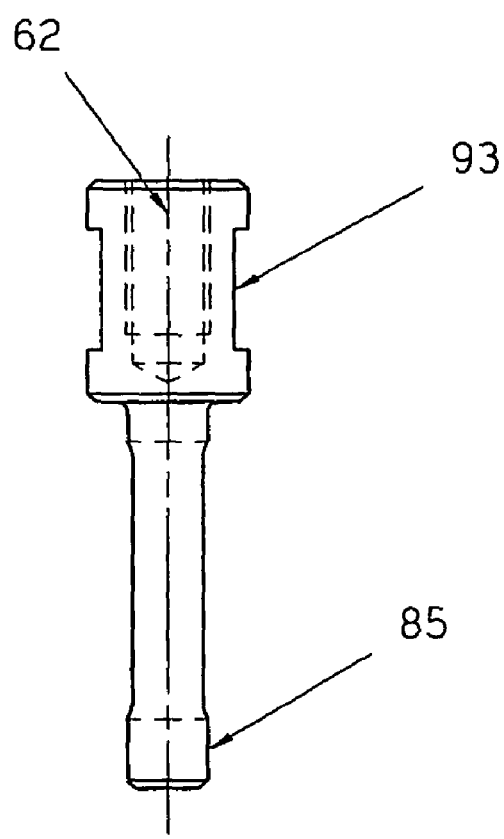
Figure 12D:
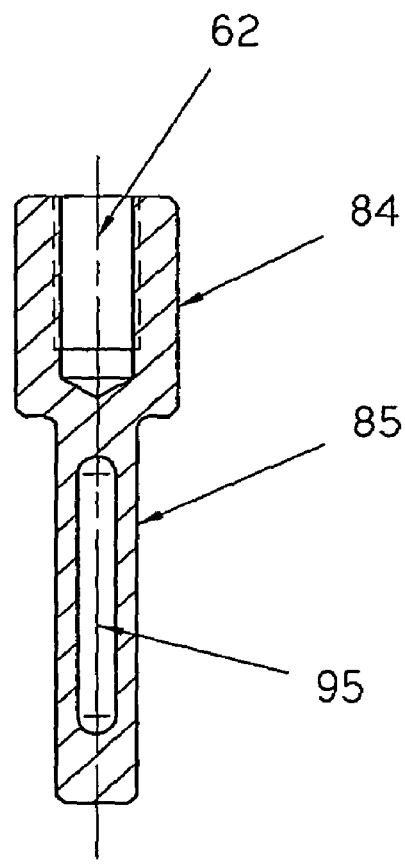

FIGS. 12A-D illustrate upper plunge pin 26. FIG. 12A is a perspective view and FIG. 12C is a top plan view of upper plunge pin 26. Upper plunge pin 26 is comprised of two portions. The first portion is upper plunge pin receiver 84, as shown in FIGS. 12B and D, in which the upper plunge pin receiver cylinder 62 is located. Upper plunge pin receiver 84 has two diametrically opposed flat sections 93 (FIG. 12B) for applying a wrench during assembly. As illustrated in FIGS. 1-3 and 6, headless set screw 29 is threaded into a receiver cylinder 63 in the bottom surface of thrust bearing washer 7 and into upper plunger pin receiver cylinder 62. The second portion of upper plunge pin 26 is slotted slide cylinder 85 shown in FIG. 12D (a cross-sectional view along section line A-A of FIG. 12C) with the slot at 95. Slot 95 extends through slide cylinder 85.

Lower plunger pin 25 is illustrated in FIGS. 13C-D. FIG. 13A is a perspective view of lower plunge pin 25. FIG. 13B is a top plan view. FIG. 13C is a cross-sectional view along section line A-A of FIG. 13B. FIG. 13D is an elevational view.

Figure 6:
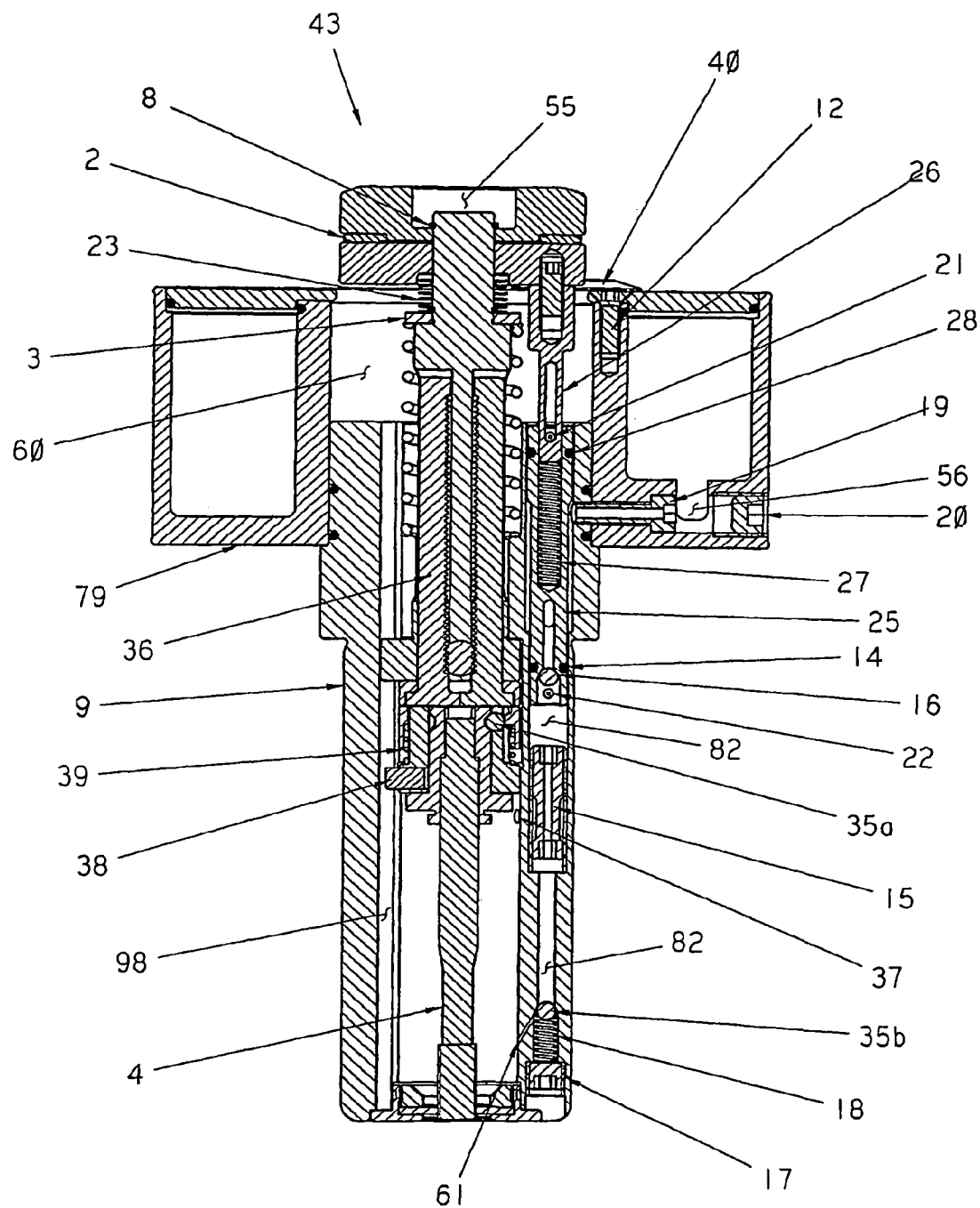
FIG. 6 is another cross-sectional view of the tapping tool of FIG. 4.

FIGS. 13C and D best show the various features of lower plunge pin 25. Lower plunge pin 25 is comprised of two portions. The first portion is lower plunge pin receiver 97a, in which the lower plunge receiver cylinder 97 is located. Lower plunge pin receiver 97a includes coiled spring apertures 21a. Coiled spring 21 is inserted into first coiled spring aperture 21a, through slot 95 of upper plunge pin 26, and into second coiled spring aperture 21a, which is in line with first coiled spring aperture 21a. Coil spring 27 is inserted into lower plunge pin receiving cylinder 97. Slotted slide cylinder 85 of upper plunge pin 26 slidably extends into lower plunge pin receiving cylinder 97, as illustrated in FIG. 6, against coil spring 27. As ram 44 strikes head 5 of tapping tool 43, head 5 moves downward along with thrust washer 7. Slotted slide cylinder 85 moves into lower plunge pin receiver cylinder 97 until a bottom surface of upper plunge pin 26 applies sufficient force against coil spring 27. This compresses and loads against upper surface of lower plunge pin 25, which forces lower plunge pin 25 to move downward into lubrication chamber 82 and bottom-out against adjustable stand-off 15. Lubrication chamber 82 extends from the top to the bottom of guide body 9. After completion of a tapping cycle, coil spring 27 assists in returning upper plunge pin 26 to its at rest position. As the bottom of slot 95 of slotted slide cylinder 85 engages with coiled spring 21 on the upstroke it pulls lower plunge pin 25 up with it. Slotted slide cylinder 85 is restrained from moving completely out of lower plunge pin receiving cylinder 97 on the upstroke of ram 44 by coiled spring 21. O-ring 28 is retained in annular slot 102 in lower plunge pin receiver 97a.

The second portion of lower plunge pin 25 is lubrication magazine 148 shown in FIGS. 13D and C. The diameter of lubrication magazine 148 is smaller than the diameter of lubrication chamber 82. O-ring 14 is retained in annular o-ring slot 104 of lubrication magazine 148. Slotted inlet 103 extends laterally through lubrication magazine 148 and connects with lubrication conduit 107. Lubrication conduit 107 extends along the axis of lubrication magazine 148 from the bottom of slotted inlet 103 to the bottom of lubrication magazine 148. The lower portion of lubrication conduit 107 flairs out to accommodate aluminum ball 16 (FIG. 6). Flaired section 113 connects with lubrication outlet 149. Coiled spring 22 (FIG. 6) is inserted through laterally aligned apertures 22a in lubrication outlet 149. Coiled spring 22 retains aluminum ball 16. Coiled spring 22 extends laterally from a first lower coiled spring aperture 22a through lubrication outlet 149 to a second coiled spring aperture 22a. The diameter of aluminum ball 16 is somewhat less than the diameter of lubrication outlet 149. This allows it to move up within lubrication outlet 149 when lower plunge pin travels downward, closing off upper port 113.

Upper and lower plunge pins work in unison to provide lubrication to tap 4 at the correct time. The correct time for ejection of lubrication onto tap 4 is just before tap 4 enters a hole in workpiece 50 and ending upon its withdrawal from the hole. The length of travel of slotted slide cylinder 85 within lower plunge pin receiver cylinder 97 determines the point in time when lubrication will be ejected onto tap 4. After ram 44 strikes head 5 of tapping tool 43, it takes a certain amount of time before driver 10 moves tap 4 into position to thread a hole in the workpiece 50. Lubrication should be ejected at this time, not much before or after. The length of travel provides this timing. The length is chosen so that it does not bottom out into lower plunge pin receiver cylinder 97 until tap 4 is near the hole to be tapped. When slotted slide cylinder 85 does bottom out, lower plunge pin 25 begins moving downward into lubrication chamber 82. At this point lubrication is forced out of ejector outlet 116 onto tap 4.

Besides the timing issue, there is the issue of loading the lubrication magazine 148 with a quantity of lubrication. The differences between the diameters of lubrication magazine 148 and lubrication chamber 82 allows lubrication to flow from reservoir 13 (through hollow cylinder cap screw 19) to fill the spaces (i) created by the differences in diameters, (ii) in slotted inlet 103, and (iii) in lubrication conduit 65, collectively referred to as the lubrication space 147. At the rest position and until slotted slide cylinder 85 bottoms out in lower plunge pin receiver cylinder 97, space 147 is loaded by the free-flow of lubrication from reservoir 13. When slotted slide cylinder 85 bottoms out, lower plunge pin begins its downward movement and aluminum ball 16 closes against the pressure of the fluid. The free-flow of lubrication from reservoir 13 is cut-off by lower plunge pin receiver 97a of lower plunge pin 25, as shown in FIGS. 2 and 3. O-rings 14 and 28 in annular o-ring slots 104 and 102 assure that none of the lubrication loaded into space 147 leaks out above or below lower plunge pin 25. As lower plunge pin 25 moves downward, the lubrication in space 147 is compressed due to the foreshortening of that portion of space 147 created by the differences in the diameters of lubrication magazine 148 and lubrication chamber 82 as can be seen in FIG. 2. Lubrication chamber 82 below lower plunge pin 25 is also filled with lubrication and the downward moving lower plunge pin 25 puts pressure on the lubrication below lower plunge pin 25 and against steel ball 35b. Steel ball 35b depresses coil spring 18 and steel ball 35b moves below ejector inlet 115 and lubrication is ejected through ejector 61 and out of ejector outlet 116 onto tap 4. As ram 44 retracts, lower plunge pin 25 also retracts and aluminum ball 16 is able to move downward out of flaired section 113 and into lubrication outlet 149. As lower plunge pin 25 is pulled up into its at rest position by slot 95 of upper plunge pin 26, lubrication space 147 is filled with free-flowing lubricant from reservoir 13. Consequently, lubrication flows around aluminum ball 16 through lubrication outlet 149 and into lubrication chamber 82 below lower plunge pin 25. Pressure on steel ball 35b is relieved and coil spring 18 moves it upward to close off ejector inlet 115. Pressure on aluminum ball 16 is also relieved and it drops downward away from flaired section 113, allowing lubrication transmission from space 147 into chamber 82. The lubrication loaded into lubrication space 147 prior to ejection of the lubrication in the lower portion of lubrication chamber 82 has been transferred to the lower portion of lubrication chamber 82 and is ready to be ejected during the next tapping cycle.

Figure 19A:
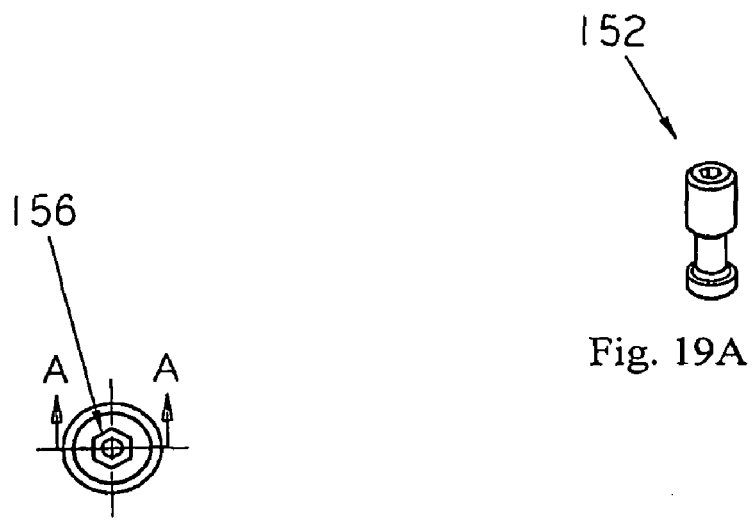
FIGS. 19A, 19B, 19C, and 19D. are respective perspective, top, cross-sectional, and bottom views of an adjustable stand-off of the tapping tool of FIG. 4.
Figure 19B:
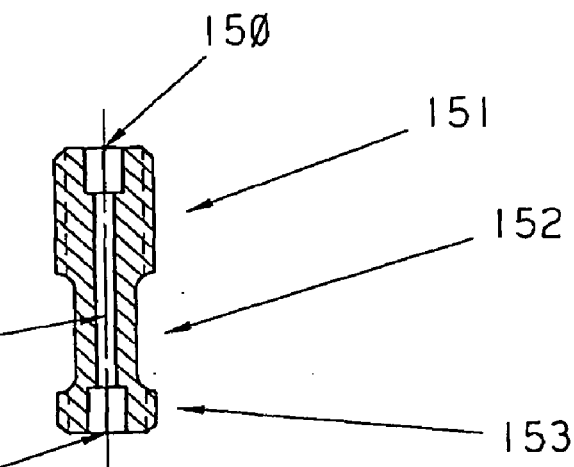
Figure 19C:
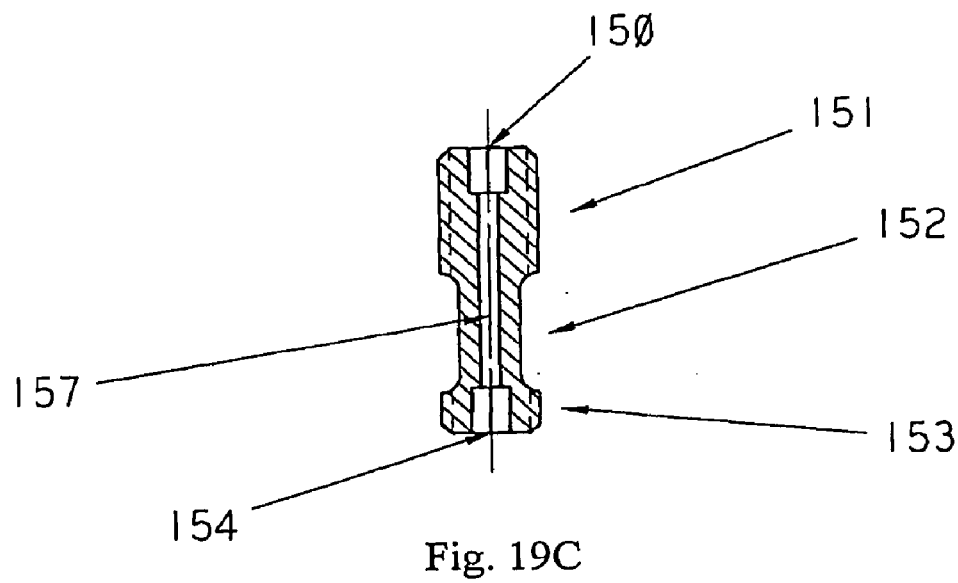
Figure 19D:
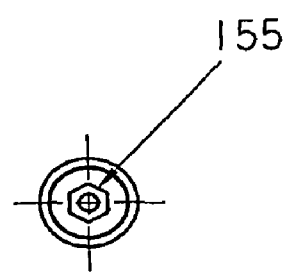

The amount of lubrication ejected onto tap 4 is controlled by adjustable standoff 15, illustrated in FIGS. 19A-D. FIG. 19A is a perspective view. FIG. 19B is a top view. FIG. 19C is a cross-sectional view along section line A-A of FIG. 19B. FIG. 19D is a bottom view. Adjustable standoff 15 is located in that portion of lubrication chamber 82 that lies below the bottom of lower plunge pin 25 as shown in FIGS. 1-3 and 6. Adjustable standoff 15 is essentially a hollow cylinder comprised of inlet 150 at the top of adjustable standoff 15. Inlet 150 is connected to lubrication column 157, which is connected to outlet 154 for transmission of lubrication to ejector 61. The body of adjustable standoff 15 comprises upper body 151, central body 152, and lower body 153. Inlet 150 is provisioned with upper hex hole 156. Outlet 154 is provisioned with lower hex hole 155.

Adjustable standoff 158 is situated in lubrication chamber 82 as shown in FIG. 1. It may seat against shoulder 158. Below shoulder 158 lubrication chamber 82 narrows. Although not shown in the Figures, the upper body 151 and lower body 153 of adjustable standoff 15 is threaded to mate with proximal threads on lubrication chamber 82. During assembly adjustable standoff 15 is inserted into lubrication chamber 82 from its top end. It is then threaded into lubrication chamber 82 using, for example, an allen wrench inserted into upper hex hole 156. It is usually threaded until it contacts shoulder 158. Then dowel pin 37 is inserted into dowel pin aperture 71 in guide body 9, as shown in FIGS. 7A-C. Dowel pin 37 transects the region proximal to the top of central body 152. In this position adjustable standoff 15 may be adjusted to its lowest point in lubrication chamber 82, i.e., against shoulder 158. As adjustable standoff 15 is adjusted to its highest point the bottom of central body 152 abuts dowel pin 37 and can be adjusted upward no further. Adjustment at any point within this range of adjustment is accomplished by removing set screw 17 at the bottom of lubrication chamber 82. After removal of set screw 17, coil spring 18 will drop out as will steel ball 35. A hex wrench is then inserted in the bottom end of the stand-off 15 and screwed upward or downward as required.

Tapping tool 43 is placed into service by filling lubrication reservoir 13 through filler cap 40 on cover 11 of lubrication reservoir 13. The overall length of driver 10, collet holder 41, and tap tool 43 are adjusted by depressing and holding push button pin 30 to disengage the two core pins 36. The collet holder 41 can then be slid up or down as required to adjust the end of tap 4 so that it is flush with the end of guide body 9.

Different tap sizes often have different collet sizes. Therefore, the collet often needs to be changed along with the tap. Collet change is performed by sliding the collet holder retainer 34 downward. The collet will then slide out of the collet holder retainer.

Figure 26A:
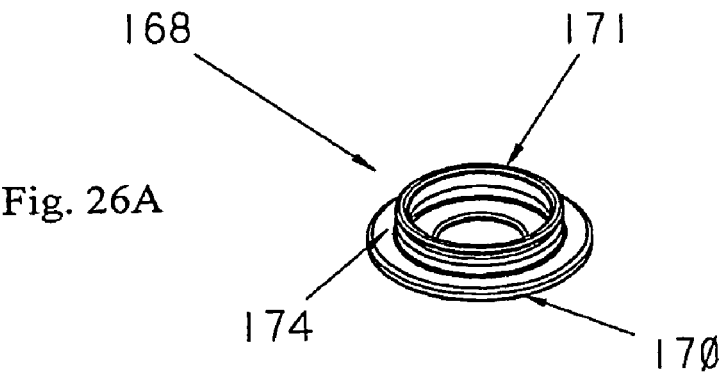
FIGS. 26A, 26B, and 26C. are respective perspective, top, and cross-sectional views of a collector base of the tapping tool of FIG. 4.
Figure 26B:
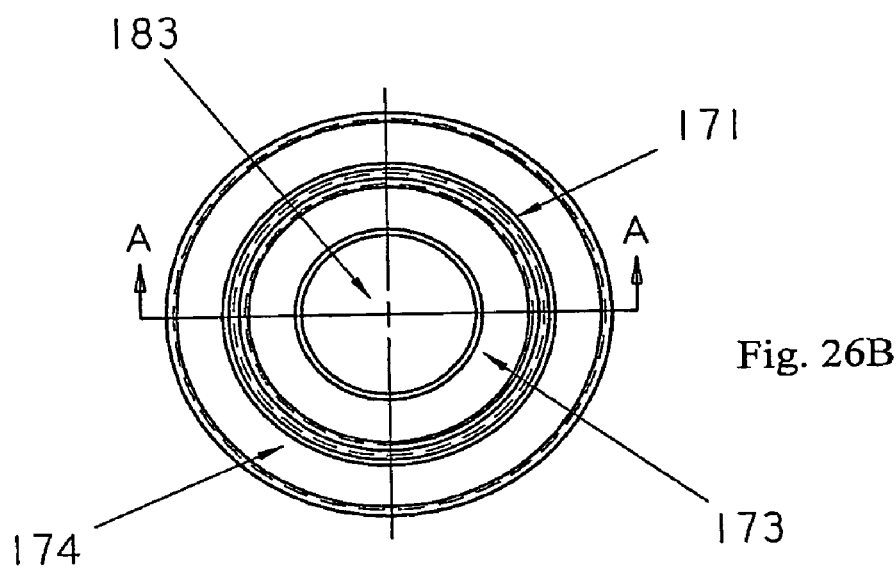
Figure 26C:
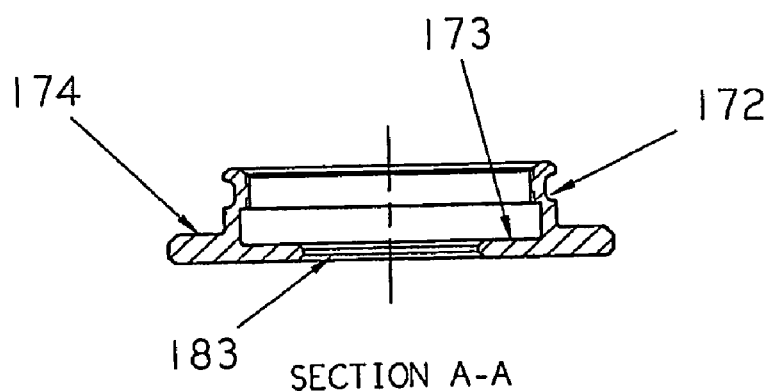
Figure 27A:
FIGS. 27A, 27B, and 27C. are respective perspective, top, and cross-sectional views of a collector top of the tapping tool of FIG. 4.
Figure 27B:
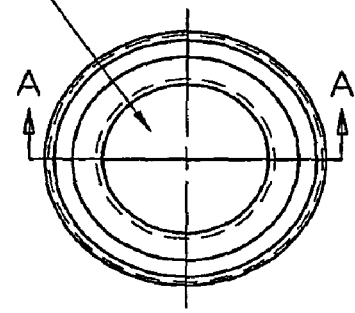
Figure 27C:
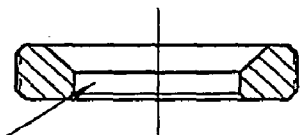
Figure 28A:
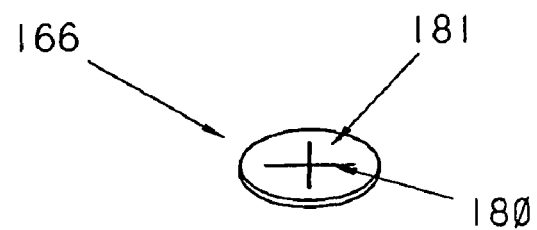
FIGS. 28A, 28B, and 28C. are respective perspective, top, and cross-sectional views of a wiper of the tapping tool of FIG. 4.
Figure 28B:
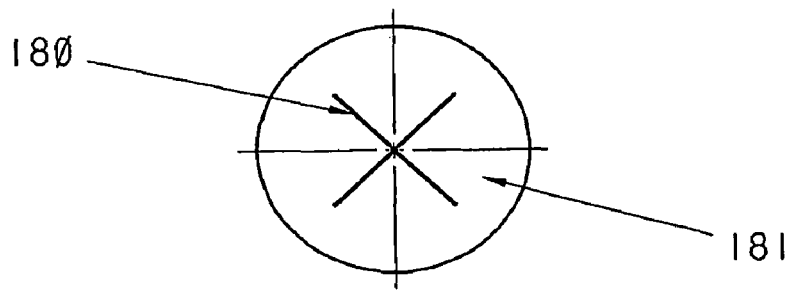
Figure 28C:

Excess lubrication may accumulate on or around workpiece 50, tap 4, and the bottom end of tapping tool 43. Lubrication collector 165 functions to wipe excess lubrication from tap 4 during each tapping cycle and thereby avoid the accumulation of oil on the workpiece and the surrounding area. Lubrication collector 165 is comprised of three elements. FIGS. 26A-C illustrate collector base 168. FIGS. 27A-C illustrate collector top 169. FIG. 28 illustrates wiper 166. Wiper 166 is sandwiched between collector base 168 and collector top 169.

Lubrication collector 165 is retained in the bottom of guide body 9 by one or more ball plungers housed in apertures around the periphery of the bottom of guide body 9. The ball plungers extend into base flange ring annular aperture 172 of collector base 168 for removable retention of collector 165.

FIG. 26A is a perspective of collector base 168. Base 168 comprises outer ring 170 with shoulder 174 for abutting engagement with the bottom of guide body 9. The diameter of outer ring 170 approximates the outer diameter of guide body 9. Flange ring 171 projects upward from outer ring 170 for mating engagement with the inner diameter of guide body 9. Its diameter approximates that of inner diameter of guide body 9. Collector base 168 is removably retained in guide body 9 by the combination of annular aperture 172 on flange ring 171 and spring loaded steel balls 175 inserted in lateral apertures 177 surrounding guide body 9. Steel balls 175 are first inserted in lateral aperture 177. Coil spring 176 is next inserted into aperture 177 and then set screw 178 is threaded into mating thread in aperture 177. Steel ball 175 is retained in aperture 177 as it exits the inner wall of guide body 9 by a reduced diameter of aperture 177 as it exits inner wall of guide body 9. The reduced diameter is somewhat less than the diameter of steel ball 175. Three steel balls are generally adequate for retention of collector base 168. Alternatively, an o-ring could be used for retention of collector base 168.

Wiper 166 is retained in collector base 168 by the combination of wiper retention shoulder 173 and collector top 169 (FIGS. 27A-C). Wiper 166 (FIG. 28) is a ring comprised of an inner ring of flaps 180 surrounded by an outer retention ring 181. Inner flap ring 180, collector flap aperture 182, and base flap aperture 183 are all of approximately the same diameter. The diameter of wiper retention shoulder 173 and wiper retention outer ring 181 are of approximately the same diameter. Wiper 166 is inserted into wiper retention shoulder 173 collector base 168. Outer threaded collector top 169 is then threaded into threaded inner diameter of base flange ring 171. Collector top 170 is threaded tightly against retention shoulder 173 so that the outer ring 181 is securely retained. Wiper 166 may be a plastic cap with a hole in its center having a diameter approximately the same as that of tap 4. Alternatively wiper flap inner ring 180 illustrated in FIG. 28 may instead be bristles or felt.

One or more lubrication return orifices 184 are placed around the periphery of the bottom of guide body 9. Return orifices 184 are directed laterally through guide body 9 wall into guide body cylinder 96 where the excess oil will accumulate above the tap wiper 166. One or more suction tubes (not shown) 185 may be connected to the return orifice for suctioned removal of the excess oil.

Although an embodiment tapping tool 43 has been described in this specification, various modifications and changes may be made without departing from the concepts described. The described embodiments are not meant to limit the scope of the inventions claimed below. Rather, only the claims are meant to describe the scope of the inventions.

What is claimed is:

1. A tapping tool comprising a guide body, a means for longitudinal movement of a tap within the guide body, and a means for lubricating the tap wherein:
   the means for lubricating the tap comprises a lubrication pump;
   the lubrication pump comprises a lubrication chamber, a means for filling the lubrication chamber with lubrication, and a means for pumping lubrication onto the tap; and
   the means for pumping lubrication onto the tap comprises an upper plunge pin, a head, a means for connecting the upper plunge pin to the head, a lower plunge pin in slidable engagement with the upper plunge pin, and an ejector proximal to the tap when it begins to tap.

2. The tapping tool of claim 1,
   wherein the upper plunge pin comprises a receiver cylinder for receiving the means for connecting the upper plunge pin to the head and a slotted side cylinder below the receiver cylinder.

3. The tapping tool of claim 2, wherein the lower plunge pin comprises a receiver cylinder for slidably receiving the slotted side cylinder, the depth of the receiver cylinder approximately equal to the length of the slotted side cylinder, and a lubrication magazine below the receiver cylinder.

4. The tapping tool of claim 3, wherein the lubrication magazine comprises a slotted inlet, a lubrication conduit, a flaired section, an outlet, and a diameter less than that of the lubrication chamber.

5. The tapping tool of claim 4, wherein the means for pumping lubrication onto the tap also comprises (i) the bottom of the slotted side cylinder in a position proximate the top of the receiver cylinder of the lower plunge pin when the tapping tool is in an at rest position, (ii) the bottom of the slotted side cylinder in a position proximate the bottom of the receiver cylinder of the lower plunge pin when the tap is proximate the ready to tap position, and (iii) when the tap is in the begin to tap position, the bottom of the slotted side cylinder is proximate to the bottom of the receiver cylinder and the lower plunge pin moves downward, in unison with the downward movement of the upper plunge pin, so that lubrication is forced into the lubrication chamber below the lower plunge pin and out the ejector.

6. The tapping tool of claim 5, wherein the means for filling the lubrication chamber with lubrication comprises (i) a lubrication reservoir and (ii) a means for lubrication to flow from the lubrication reservoir into a lubrication space, out of the lubrication space through the normally open flaired section, and into the lubrication chamber below the flaired section.

7. The tapping tool of claim 6, wherein the means for pumping lubrication onto the tap further comprises (a) a normally closed ejector inlet which is opened by downward movement of the lower plunge pin against the lubrication in the lubrication chamber and (b) an ejector sized to restrict the flow of lubrication from the ejector outlet to create back pressure in the lubrication chamber forcing a ball in the flaired section to close the lubrication conduit when the lower plunge pin moves downward.

8. The tapping tool of claim 7, wherein the ejector inlet is normally closed by a steel ball biased upwards against the inlet by a spring retained in the lubrication chamber so that downward force of the lower plunge pin against lubrication in the lubrication chamber to force the ball to move down against the spring force, open the ejector inlet, and allow lubrication to flow from the ejector outlet onto the tap.

9. The tapping tool of claim 8, wherein the lubrication pump also comprises an adjustable standoff for adjusting the amount of lubrication to be ejected onto the tap.

10. The tapping tool of claim 9, wherein the adjustable standoff is adjusted by threading the standoff between an upper minimum lubrication position and a lower maximum lubrication position.

11. A tapping tool comprising a guide body, a means for longitudinal movement of a tap within the guide body, and a means for lubricating the tap, wherein:
the guide body comprises a driver cylinder centrally disposed in the guide body and a means for connecting the guide body to a rotatable body; and
the means for connecting the guide body to a rotatable body comprises optionally (i) an indexing holder key on an indexing holder engaged with an indexing keyway in the guide body or (ii) an indexing holder keyway in an indexing holder engaged with an indexing key on the guide body.

12. A tapping tool comprising a guide body, a means for longitudinal movement of a tap within the guide body, a lubrication system for lubricating, the tap, lubrication being actuated by the means for longitudinal movement to selectively deliver lubrication with a pump action operable with the means for longitudinal movement, wherein:
the guide body comprises a driver cylinder centrally disposed in the guide body and a means for connecting the guide body to a rotatable body;
the means for longitudinal movement of a tap within the guide body comprises a driver;
the driver comprises a column adapted for sliding, mating engagement within the driver cylinder; and
the driver also comprises a pin end and a key end.

13. A tapping tool comprising a guide body, a means for longitudinal movement of a tap within the guide body, and a lubrication system for lubricating the tap, lubrication being actuated by the means for longitudinal movement to selectively deliver lubrication with a pump action operable with the means for longitudinal movement, wherein:
the lubrication system comprises a lubrication pump actuated during a tapping cycle;
the lubrication pump comprises a lubrication chamber, a means for filling the lubrication chamber with lubrication, and a means for pumping lubrication onto the tap;
the means for filling the lubrication chamber with lubrication comprises a reservoir and a means for lubrication to flow from the reservoir into the lubrication chamber; and
the reservoir surrounds an upper segment of the guide body.

14. The tapping tool of claim 13, wherein the reservoir is supported on an annular shoulder of the guide body.

15. The tapping tool of claim 14, wherein the means for lubrication to flow from the reservoir into the lubrication chamber is a hollow cylinder cap screw extending through the reservoir and a lateral aperture in the guide body and into the lubrication chamber.

16. The tapping tool of claim 11, wherein the guide body also comprises a lubrication chamber parallel to the driver cylinder.

17. The tapping tool of claim 16 wherein the guide body also comprises (a) a driver keyway slot, (b) a well, and (c) at least one ejector.

18. The tapping tool of claim 17 wherein the guide body also comprises (a) the indexing keyway, (b) at least one side window, and (c) a reservoir insert for insertion into a reservoir receiving cylinder.

19. A tapping tool comprising a guide body with a driver cylinder, a means for longitudinal movement of a tap within the guide body, and a means for lubricating the tap, wherein:
the means for longitudinal movement of a tap within the guide body comprises a driver;
the driver comprises a column adapted for sliding, mating engagement within the driver cylinder;
the driver also comprises a pin end and a key end; and
the driver pin end also comprises (a) a thrust washer on the pin end abutting a shoulder, (b) a compliance spring on the thrust washer, (c) a thrust bearing on the compliance spring, (d) and a head on the thrust bearing.

20. The tapping tool of claim 19, wherein the driver column also comprises (a) a shoulder at the nexus of the pin end and the driver column and (b) at least one core pin receiver.

21. The tapping tool of claim 20, wherein the key end comprises (a), a key for mating engagement with the keyway slot in the driver cylinder, (b) a push button receiver, (c) a push button, (d) at least one core pin inserted in a core pin receiver, (d) a core pin holder, (e) a collet holder removably affixed to the core pin holder, (e) a collet, and (f) a tap in the collet, the core pin holder, collet holder, collet, and tap in axial alignment with the driver column.

22. The tapping tool of claim 21, wherein the push button receiver also comprises (a) a coil spring to position the push button to lock at least one core pin and (b) a dowel pin for retention of the push button in the push button receiver and for movement of the push button from the locked position to an unlocked position.

23. The tapping tool of claim 22, wherein the push button also comprises teeth for mating engagement with teeth on at least one core pin.

24. The tapping tool of claim 23, comprising a means for collecting excess lubrication.

25. The tapping tool of claim 24, comprising a die assembly on the underside of the workpiece in alignment with the tap.

26. The tapping tool of claim 12, wherein the driver pin end also comprises (a) a thrust washer on the pin end abutting a shoulder, (b) a compliance spring on the thrust washer, (c) a thrust bearing on the compliance spring, (d) and a head on the thrust bearing.

27. The tapping tool of claim 26, wherein the driver column also comprises (a) a shoulder at the nexus of the pin end and the driver column and (b) at least one core pin receiver.

28. The tapping tool of claim 27, wherein the key end comprises (a), a key for mating engagement with the keyway slot in the driver cylinder, (b) a push button receiver, (c) a push button, (d) at least one core pin inserted in a core pin receiver, (d) a core pin holder, (e) a collet holder removably affixed to the core pin holder, (e) a collet, and (f) a tap in the collet, the core pin holder, collet holder, collet, and tap in axial alignment with the driver column.

* * * * *